(12) United States Patent
Hayashi

(10) Patent No.: US 7,770,171 B2
(45) Date of Patent: Aug. 3, 2010

(54) PLAN EXECUTING APPARATUS, METHOD OF PLAN EXECUTION, AND COMPUTER PROGRAM PRODUCT THEREFOR

(75) Inventor: Hisashi Hayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1373 days.

(21) Appl. No.: 11/213,891

(22) Filed: Aug. 30, 2005

(65) Prior Publication Data

US 2006/0218555 A1    Sep. 28, 2006

(30) Foreign Application Priority Data

Mar. 23, 2005    (JP) ............... 2005-084460

(51) Int. Cl.
*G06F 9/46* (2006.01)
*G06F 13/24* (2006.01)
*G06F 9/44* (2006.01)

(52) U.S. Cl. ............... 718/102; 710/260; 712/244
(58) Field of Classification Search ........... 718/102; 710/260; 712/244
See application file for complete search history.

(56) References Cited

U.S. PATENT DOCUMENTS

| | | | | | |
|---|---|---|---|---|---|
| 4,930,068 | A | * | 5/1990 | Katayose et al. | 710/261 |
| 5,293,591 | A | * | 3/1994 | Dettmer | 712/244 |
| 5,774,711 | A | * | 6/1998 | Henry et al. | 712/244 |
| 5,864,701 | A | * | 1/1999 | Col et al. | 710/260 |
| 6,633,942 | B1 | * | 10/2003 | Balasubramanian | 710/264 |
| 7,177,967 | B2 | * | 2/2007 | Jeyasingh et al. | 710/260 |
| 7,209,994 | B1 | * | 4/2007 | Klaiber et al. | 710/264 |
| 7,213,137 | B2 | * | 5/2007 | Boom et al. | 712/245 |
| 7,237,051 | B2 | * | 6/2007 | Bennett et al. | 710/260 |
| 7,305,502 | B2 | * | 12/2007 | Kadatch et al. | 710/68 |
| 7,509,644 | B2 | * | 3/2009 | Worley, Jr. | 718/104 |
| 2005/0080753 | A1 | * | 4/2005 | Vega et al. | 706/21 |

(Continued)

FOREIGN PATENT DOCUMENTS

JP    6-187171    7/1994

(Continued)

OTHER PUBLICATIONS

U.S. Appl. No. 11/368,386, filed Mar. 7, 2006, Tokura et al.

(Continued)

*Primary Examiner*—Meng-Ai An
*Assistant Examiner*—Adam Lee
(74) *Attorney, Agent, or Firm*—Oblon, Spivak, McClelland, Maier & Neustadt, L.L.P.

(57) ABSTRACT

A plan executing apparatus includes: an executing unit that executes a plan which is a sequence of processes; a processing state retaining unit that retains a processing state of a target object of the plan; an execution information retaining unit that retains execution information which is information relating to execution of a plan in execution; an interrupt instruction accepting unit that accepts an interrupt instruction during execution of the plan; an interrupt information identifying unit that identifies interrupt information relating to execution of an interrupting plan, on accepting the interrupt instruction for the interrupting plan; and an interrupt possibility determining unit that determines whether the interrupting plan is to be executed or not based on the processing state, the execution information of the plan in execution, and the interrupt information.

12 Claims, 17 Drawing Sheets

U.S. PATENT DOCUMENTS

| | | | |
|---|---|---|---|
| 2005/0096789 A1* | 5/2005 | Sharma et al. | 700/245 |
| 2005/0138627 A1* | 6/2005 | Bradford et al. | 718/107 |
| 2005/0228919 A1* | 10/2005 | Trainin | 710/260 |
| 2005/0240701 A1* | 10/2005 | Kuboshima et al. | 710/260 |
| 2006/0037020 A1* | 2/2006 | Accapadi et al. | 718/102 |
| 2006/0179439 A1* | 8/2006 | Jones et al. | 718/105 |

FOREIGN PATENT DOCUMENTS

| | | |
|---|---|---|
| JP | 2004-283958 | 10/2004 |
| JP | 2005-25407 | 1/2005 |

OTHER PUBLICATIONS

Dana Nau, et al. "SHOP: Simple Hierarchical Ordered Planner"; Technical Report CS-TR-3981, UMIACS-TR-9904, IJCAI-99; pp. 968-973.

Thorsten Belker, et al. "Learning to Optimize Mobile Robot Navigation Based on HTN Plans"; Proceedings of The 2003 IEEE International Conference on Robotics & Automation, Taipei, Taiwan; Sep. 14-19, 2003; pp. 4136-4141.

U.S. Appl. No. 11/497,336, filed Aug. 2, 2006, Ozaki et al.

* cited by examiner

PLAN EXECUTING APPARATUS, METHOD OF PLAN EXECUTION, AND COMPUTER PROGRAM PRODUCT THEREFOR

CROSS-REFERENCE TO RELATED APPLICATIONS

This application is based upon and claims the benefit of priority from the priority Japanese Patent Application No. 2005-084460, filed on Mar. 23, 2005; the entire contents of which are incorporated herein by reference.

BACKGROUND OF THE INVENTION

1. Field of the Invention

The present invention relates to a plan executing apparatus which executes an interrupting plan, a method of plan execution, and a computer program product therefor.

2. Description of the Related Art

During an execution of a plan, which is a predetermined task sequence, an execution of another plan is sometimes required as an interrupt. A known technique for execution management of such an interrupting plan is called scheduling. According to one known technique of scheduling, when there are plural interrupts, the interrupts are ordered according to their priorities (see, for example Japanese Patent Application Laid-Open No. 06-187171).

When such a technique is employed for a mobile robot, however, the mobile robot may move to a different location. If an execution of an interrupting plan is allowed during execution of another plan, then the mobile robot may move to a location where the execution of the interrupted plan is impossible.

For example, assume that an execution of a task "climb the stairs" is interrupted by a task "go to the living room." After the execution of the interrupting task, the mobile robot is in the living room where the mobile robot cannot resume and accomplish the interrupted task even if the robot is instructed to restore the interrupted task, "climb the stairs."

Thus, when an execution of a certain task is influenced by an object on which the task is executed, and at the same time, the execution of the task brings about a change in state of the object, task management cannot be carried out in the conventional manner.

SUMMARY OF THE INVENTION

According to one aspect of the present invention, a plan executing apparatus includes: an executing unit that executes a plan including a sequence of processes; a processing state retaining unit that retains a processing state of a target object to be processed according to the plan; an execution information retaining unit that retains execution information of a plan in execution; an interrupt instruction accepting unit that accepts an interrupt instruction during execution of the plan; an interrupt information identifying unit that identifies interrupt information relating to execution of a predetermined interrupting plan, on accepting the interrupt instruction for the predetermined interrupting plan; and an interrupt possibility determining unit that determines whether the interrupting plan is to be executed or not based on the processing state, the execution information of the plan in execution, and the interrupt information.

According to another aspect of the present invention, a plan executing apparatus includes: an executing unit that executes a plan including a sequence of processes; a processing state retaining unit that retains a processing state of a target object to be processed according to the plan; an execution information retaining unit that retains execution information of a plan in execution; an interrupt instruction accepting unit that accepts an interrupt instruction during execution of the plan; an interrupting plan formulating unit that formulates an interrupting plan on accepting the interrupt instruction based on the processing state retained by the processing state retaining unit and the execution information retained by the execution information retaining unit; and an interrupt controlling unit that interrupts with the interrupting plan.

According to still another aspect of the present invention, a method of executing a plan includes: executing a plan including a sequence of processes; accepting an interrupt instruction during execution of the plan; identifying interrupt information relating to execution of an interrupting plan, on accepting the interrupt instruction of the interrupting plan; determining whether the interrupting plan is to be executed or not based on a processing state of a target object to be processed according to the plan in execution, execution information of the plan in execution, and the identified interrupt information. The processing state is retained in a processing state retaining unit. The execution information is retained in an execution information retaining unit.

According to still another aspect of the present invention, a method of executing a plan includes: executing a plan including a sequence of processes; accepting an interrupt instruction during execution of the plan;

formulating an interrupting plan on accepting the interrupt instruction based on a processing state of a target object to be processed according to the plan in execution, and execution information of the plan in execution; and interrupting with the formulated interrupting plan. The processing state is retained in a processing state retaining unit. The execution information is retained in an execution information retaining unit.

A computer program product according to still another aspect of the present invention causes a computer to perform the method according to the present invention

DETAILED DESCRIPTION OF THE PREFERRED EMBODIMENTS

Hereinbelow, an exemplary embodiment of a plan executing apparatus, a method of plan execution, and a computer program product for plan execution according to the present invention will be described in detail with reference to the accompanying drawings. It should be noted that the present invention is not limited to the embodiment described below.

Figure 1:
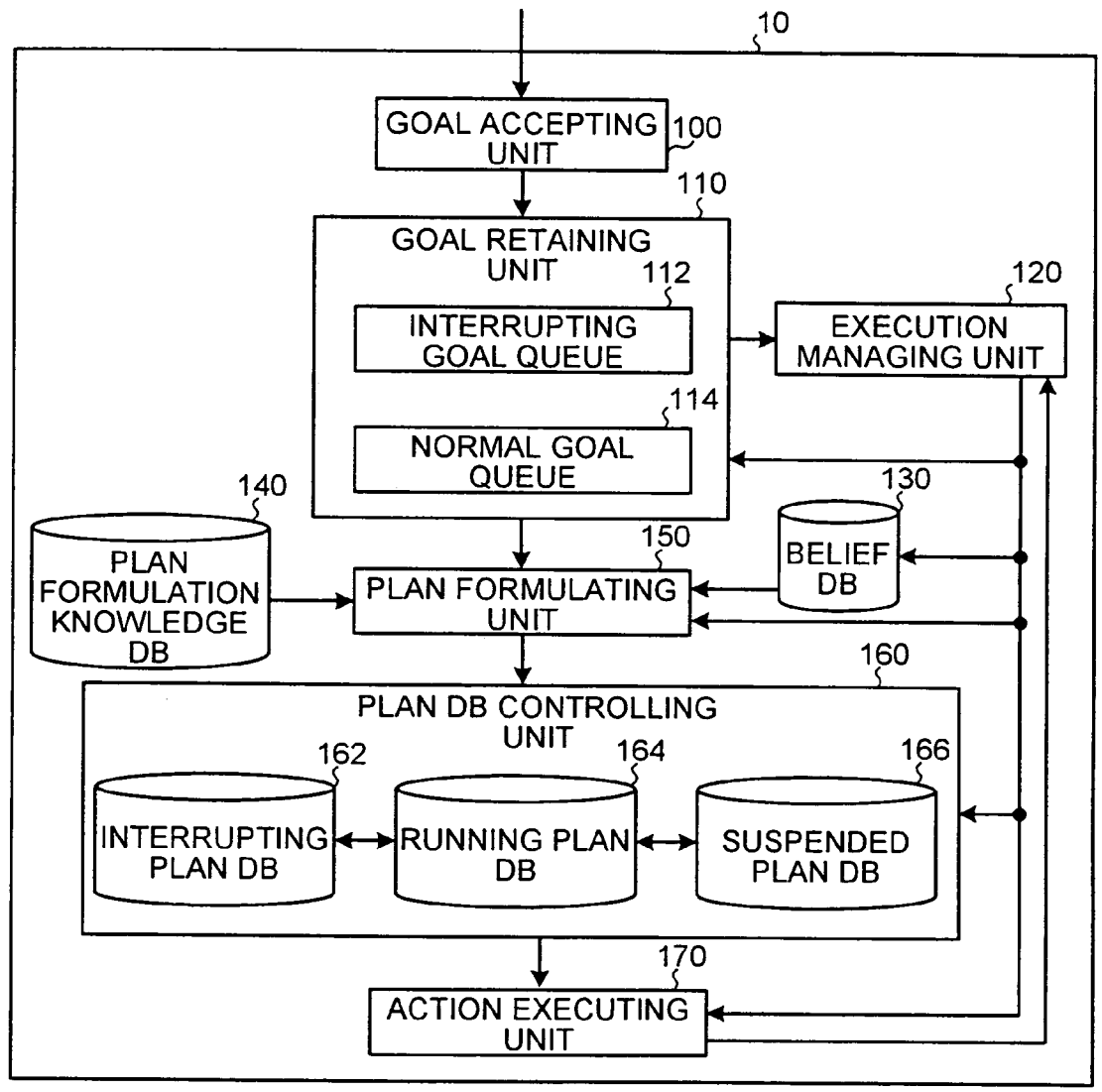
FIG. 1 is a functional diagram of a mobile robot including a plan formulating unit according to an embodiment of the present invention.

FIG. 1 is a functional diagram of a mobile robot 10 including a plan executing apparatus according to the embodiment.

The mobile robot 10 includes a goal accepting unit 100, a goal retaining unit 110, an execution managing unit 120, a belief database (DB) 130, a plan formulation knowledge DB 140, a plan formulating unit 150, a plan DB controlling unit 160, and an action executing unit 170.

The goal accepting unit 100 acquires a goal. The goal accepting unit 100 further accepts a designation of the acquired goal as one of a normal goal and an interrupting goal.

Here, the "goal" means a task, an execution of which is desired, or a state which is desired to be achieved. Alternatively, the goal may refer to a target state desired to be accomplished. The "interrupting goal" is a goal accomplished by the interrupt, whereas the "normal goal" is a goal other than the interrupting goal, i.e., a goal which should be processed according to an order of acquisition thereof.

The goal accepting unit 100 according to the embodiment is, in other words, an interrupt instruction accepting unit.

The goal retaining unit 110 includes an interrupting goal queue 112 and a normal goal queue 114. The interrupting goal queue 112 retains interrupting goals acquired by the goal accepting unit 100 in an order of acquisition. The normal goal queue 114 retains normal goals acquired by the goal accepting unit 100 in an order of acquisition.

The execution managing unit 120 manages the goal retaining unit 110, the belief DB 130, the plan formulating unit 150, the plan DB controlling unit 160, and the action executing unit 170. The execution managing unit 120 in the embodiment may be called an interrupt information identifying unit, an interrupt possibility determining unit, or an interrupt controlling unit.

The belief DB 130 stores belief information. Here, the "belief information" is information relating to state of the mobile robot 10 to be processed, and information which is dynamically updated such as a precondition required for the execution of a process. The information relating to the state of the mobile robot 10 is, for example, information that indicates that the mobile robot 10 is in a stairway when the mobile robot 10 is in the stairway. When such information is provided, it can be determined that tasks which should be executed outside the stairway cannot be executed at the moment.

The precondition of the process includes, for example, a current time, and a current date. For example, a task that provides a voice, "Good morning" does not suit to a time slot other than morning. When the belief indicating the current time is provided, it can be determined whether the task that provides a voice, "Good morning" should be executed or not.

The belief DB 130 further stores a topological map of an area where the mobile robot 10 operates.

The belief information according to the embodiment, in other words, indicates a processing state of a target object. The belief DB 130 according to the embodiment is, in other words, a processing state retaining unit.

The plan formulating unit 150 formulates a plan corresponding to a first goal in the interrupting goal queue 112 or the normal goal queue 114. Here, the "plan" is a process sequence for executing or accomplishing a goal. The plan includes plural actions. Here, the "action" refers to a minimum unit in plan execution.

Figure 2:
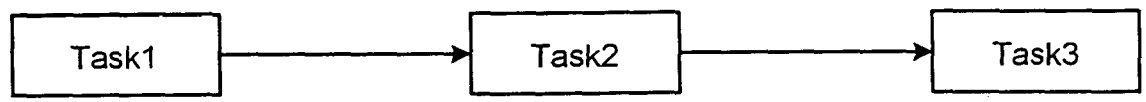
FIG. 2 is a diagram of a relation between a plan and an action.

Next, with reference to FIG. 2, the plan and the action will be described in detail. FIG. 2 is a diagram showing a relation between the plan and the action. The plan indicates an order of the execution of the tasks. For example, a plan which indicates an order of all tasks, such as, "Task 1, Task 2, Task 3" means that the tasks are executed in the order of "Task 1," "Task 2," and "Task 3." In the embodiment, a task which is executable by the action executing unit 170 is referred to as an "action." In addition, a plan that indicates an order of all tasks is referred to simply as a "plan" in the embodiment.

The plan can be classified into a specific plan or an abstract plan. The specific plan is a plan which represents only an order of execution of actions. On the other hand, the abstract plan is a plan which is not a specific plan. The mobile robot 10 according to the embodiment handles specific plan.

The plan formulation knowledge DB 140 stores knowledge for plan formulation which should be referred to at the plan formulation by the plan formulating unit 150. Specifically, the plan formulation knowledge DB 140 stores actions to be included in the plan. Further, the plan formulation knowledge DB 140 stores a pre-execution condition and an execution effect in association with each action. The pre-execution condition and the execution effect will be described later.

The plan formulation knowledge DB 140 in the embodiment is, in other words, an execution information retaining unit.

The plan DB controlling unit 160 controls an interrupting plan DB 162, a running plan DB 164, and a suspended plan DB 166. The interrupting plan DB 162 stores a plan which is acquired by the plan formulation knowledge DB 140. The running plan DB 164 stores a plan to be executed. The suspended plan DB 166 stores a plan which is being suspended.

The execution managing unit 100 selects the next action to execute, following the plan which is stored in the running plan DB 164, and instructs the action execution unit 170 to execute the action. In other words, the action execution unit 170 sequentially executes each action in the plan according to the instruction of the execution managing unit 100.

Immediately after the completion of each action execution, the action execution unit 170 reports the result to the execution managing unit 100, and the execution managing unit 100 updates the information in the belief DB 130 to the state after the action execution.

Figure 3:
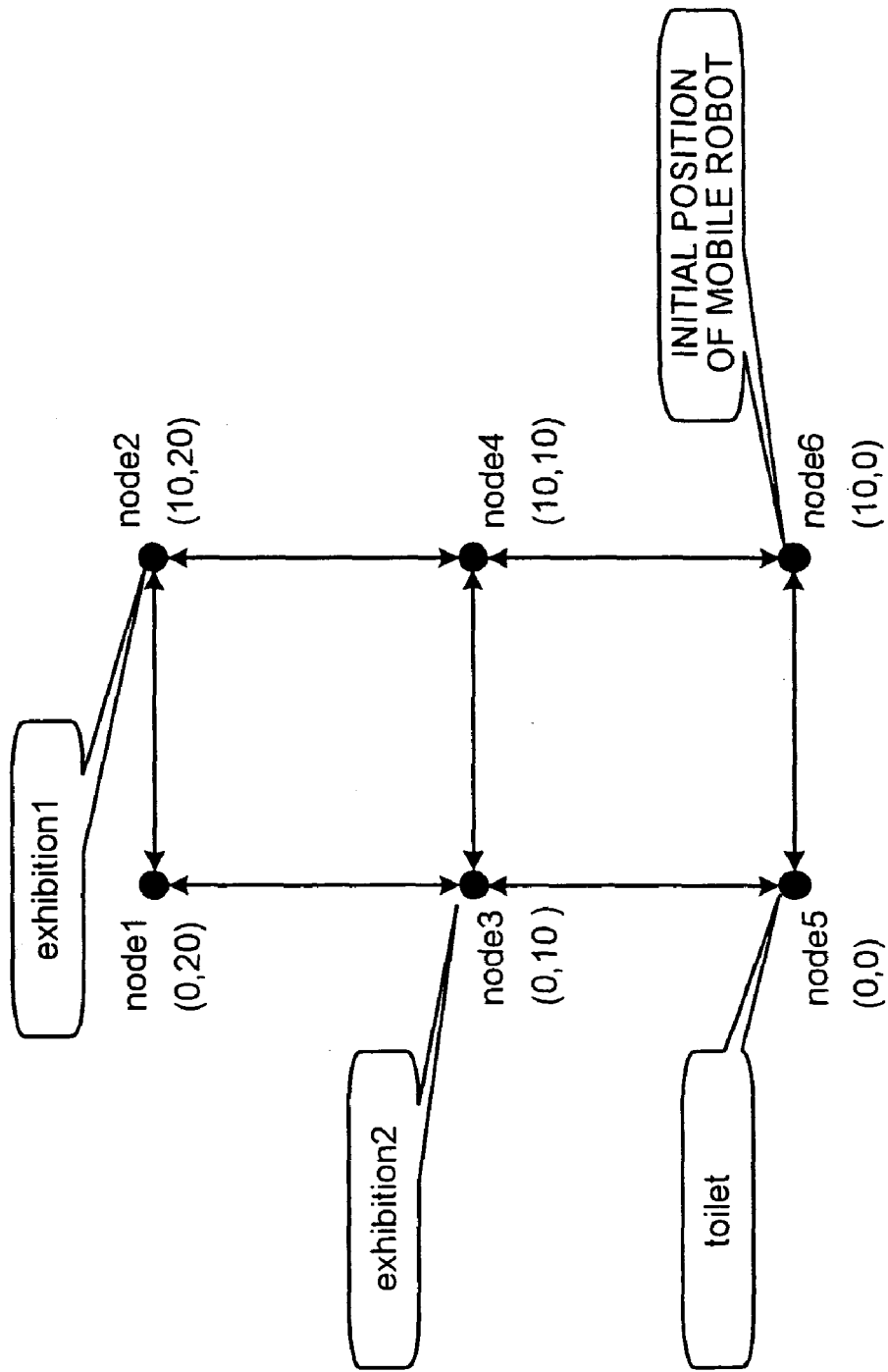
FIG. 3 is a schematic diagram of a topological map stored in a belief database.

FIG. 3 is a schematic diagram of a topological map stored in the belief DB 130. As shown in FIG. 3, the belief DB 130 stores nodes (node1 to node6) on the map as belief information. On node2, an exhibit denoted as exhibition1 resides. On node3, an exhibit denoted as exhibition2 resides. On node5, a toilet is provided. The information as such is also stored as the belief information.

When the mobile robot moves to the exhibit, the mobile robot delivers an explanation of the exhibit on the spot. Information corresponding to such explanation is also stored in the belief DB 130 as the belief information.

The nodes (node1, node2, node3, node4, node5, and node6), that are points on the map, are represented by relative coordinates (0,20), (10,20), (0,10), (10,10), (0,0), (10,0), respectively.

Specifically, the belief information is stored in the belief DB 130 in the form of following descriptions.

belief(coordinate(node1,0,20)).

belief(coordinate(node2,10,20)).
belief(coordinate(node3,0,10)).
belief(coordinate(node4,10,10)).
belief(coordinate(node5,0,0)).
belief(coordinate(node6,10,0)).

On node2, the exhibit indicated as exhibition1 resides. On node3, the exhibit indicated as exhibition2 resides. Further, the toilet is provided on node5. Such information is stored as the belief information in the belief DB 130 specifically in the form of following descriptions.
belief(location(exhibition1,node2)).
belief(location(exhibition2,node3)).
belief(location(toilet,node5).

Explanations for the exhibition1 and the exhibition2 are, respectively, "This is the first Japanese Language word processor in the world," and "This is a robot which spins a top." Such information is stored as the belief information in the belief DB 130 specifically in the form of following descriptions.
belief(contents(exhibition1, "This is the first Japanese Language word processor in the world.")).
belief(contents(exhibition2,"This is a robot which spins a top.")).

Further, at the toilet, an explanation "Here is a toilet." is provided. Such belief information is stored as the belief information in the belief DB 130 in the form of following description.
belief(contents(toilet,"Here is a toilet.")).

The mobile robot 10 can move from node1 to node2 as well as from node2 to node1. Such information is stored as the belief information in the belief DB 130 in the form of following descriptions.
belief(connects(node1,node2)).
belief(connects(node2,node1)).

Similarly, information on connections among nodes is stored in the belief DB 130 in the form of following descriptions.
belief(connects(node1,node3)).
belief(connects(node3,node1)).
belief(connects(node2,node4)).
belief(connects(node4,node2)).
belief(connects(node3,node4)).
belief(connects(node4,node3)).
belief(connects(node3,node5)).
belief(connects(node5,node3)).
belief(connects(node4,node6)).
belief(connects(node6,node4)).
belief(connects(node5,node6)).
belief(connects(node6,node5)).

Assume that the mobile robot is on node6 in an initial state. Specifically, such information is stored as belief information in the belief DB 130 in the form of following description.
belief(at(node6)).

Here, "at(node6)" is not fulfilled once the mobile robot moves away from node6. In other words, true or false of "at(_)" dynamically changes. Here, "_" stands for an anonymous variable which can be substituted for by any value.

Specifically, a following description is stored in the belief DB 130 so as to indicate that the true or false of the description dynamically changes.
dy(at(_)).

Fact that current time is morning is stored in the belief DB 130 in the form of following description.
belief(now(morning)).

Here, "now(morning)" is erased by an external module in the afternoon, since the condition "now(morning)" is not fulfilled in the afternoon. In other words, true or false of "now(_)" dynamically changes. Hence, specifically, a following description is stored in the belief DB 130 so as to indicate that the true or false dynamically changes.
dy(now(_)).

Figure 4:
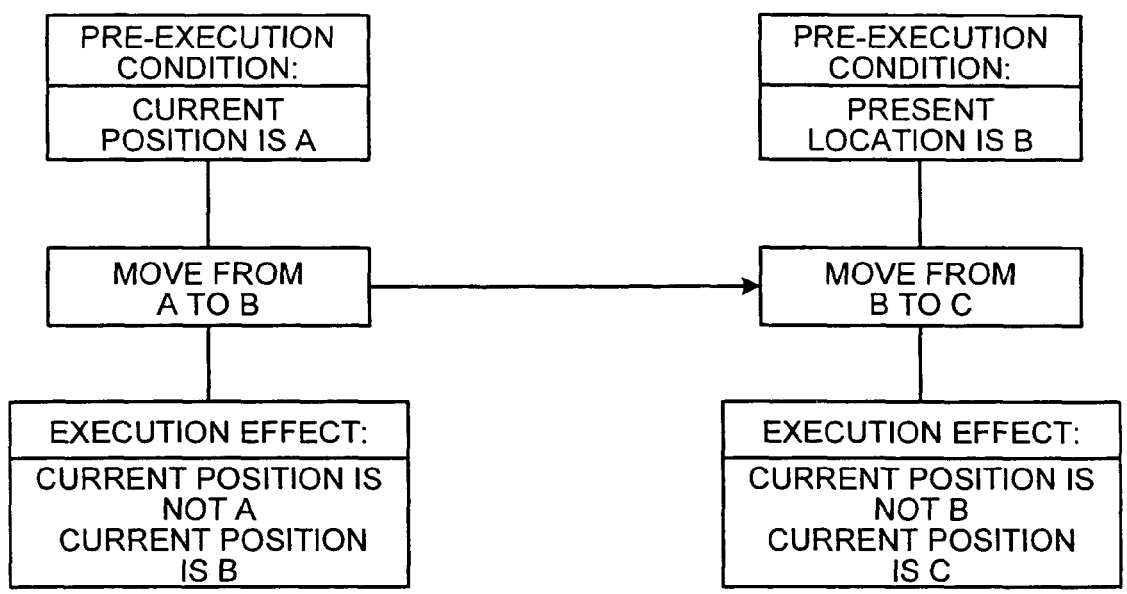
FIG. 4 is a schematic diagram of knowledge for plan formulation stored in a plan formulation knowledge database.

FIG. 4 is a schematic diagram of the plan formulation knowledge stored in the plan formulation knowledge DB 140.

Specifically, the plan formulation knowledge is an action to be included in the plan. Further, a pre-execution condition and an execution effect are associated with each action. Here, the pre-execution condition is a condition which must be satisfied immediately before the execution of each action. The execution effect is a condition, a feature, or the like which must successively hold immediately after the execution of the action. The same action may be associated with different pre-execution conditions if included in different plans. In the embodiment, the pre-execution condition and the execution effect are explicitly stored for each action included in the plan.

For example, a pre-execution condition "current position is A" is stored for an action "move from A to B" shown in FIG. 4. Further, execution effects "current position is not A" and "current position is B" are stored for the action.

For an action "move from B to C," a stored pre-execution condition is "current position is B" and stored execution effects are "current position is not B" and "current position is C."

Specifically, such information is stored in the plan formulation knowledge DB 140 in the following form.
[precond([at(a)]),
move(a, b),
effect([terminates(at(a)),initiates(at(b))])
precond ([at (b)])
move(b, c),
effect([terminates(at(b)),initiates(at(c))])]

Here, "move(a,b)" represents an action of moving from a position "a" to a position "b," "precond([at(a)])" indicates a pre-execution condition of the action "move(a,b)," and "at (a)" represents that the mobile robot is at the position "a."

Further, "effect([terminates(at(a)),initiates(at(b))])" represents the execution effect of the action "move(a,b)," "terminates(at(a))" represents that the mobile robot moves away from the current position "a," and "initiates(at(b))" represents that the mobile robot comes to the position "b" as the current position.

Similarly, "move(b,c)" represents an action of moving from the position "b" to a position "c," "precond([at(b)])" represents a pre-execution condition of the action "move (b,c)," and "effect([terminates(at(b)),initiates(at(c))])" represents an execution effect.

For example, an action of reading a text does not have a pre-execution condition or an execution effect. When the action does not have the pre-execution condition and the execution effect, a following description is stored in the plan formulation knowledge DB 140.

action(speak(Text),[
],[
]).

The above description represents an action where the mobile robot reads "Text." The description "Text" in "speak (Text)" is a variable which can be substituted for by any character strings, and hence the above description can be modified to indicate an action of reading any character strings.

Further, a following description represents an action of directly moving from a current node to another node without going through a different node.

```
action(gotoNextNode(NextNode),[
    at(CurrentNode),
    connects(CurrentNode,NextNode)
],[
    terminates(at(CurrentNode)),
    initiates(at(NextNode))
]).
```

Here, "gotoNextNode(NextNode)" represents an action, and "CurrentNode" is a variable which represents a node on which the mobile robot stay at present. Further, "NextNode" is a variable which represents a node to which the mobile robot is to move to.

The description "at(CurrentNode)" represents a pre-execution condition, and indicates that the mobile robot is currently on the node "CurrentNode." The description "connects(CurrentNode,NextNode)" also represents a pre-execution condition, and indicates that the mobile robot can directly move from "CurrentNode" to "NextNode." The effect of the action "terminates(at(CurrentNode)), initiates(at(NextNode))" represents that the current position changes from "CurrentNode" to "NextNode."

The plan formulation knowledge DB 140 also stores a way to disintegrate a task, which is not an action, as the plan formulation knowledge. For example, assume that the goal accepting unit 100 accepts as a goal a task "show(Object)" which instructs the mobile robot to move to a position where an object ("Object") is and to deliver an explanation thereof. Such task itself is not a unit, i.e., an action which is executable by the action executing unit 170, and hence needs to be disintegrated into actions. The plan formulation knowledge DB 140 stores information for such disintegration of the task.

Pre-execution condition for the task "show(Object)" is "location(Object,Node)." For the execution of the task when the pre-execution condition is fulfilled, the mobile robot is required firstly to move to a node ("Node") and secondly to deliver an explanation of the object ("Object"). Hence, the task "show(Object)" can be disintegrated into a task "goto(Node)" and a task "explain(Object)." Specifically, the task "show(Object)" can be disintegrated into tasks described as follows.

```
htn(show(Object),[
    location(Object,Node)
],[
    goto(Node),
    explain(Object)
]).
```

An execution of a task "tellLocation(Object)" that instructs the mobile robot to count a number of nodes on which an "Object" resides can be accomplished by providing a character string which indicates that "Object+'is on'+Node" in voice output. In other words, the task can be accomplished when the pre-execution condition "location(Object,Node)" which represents that "Object" is on a node "Node" is fulfilled.

Hence, the task "tellLocation(Object)" can be disintegrated into tasks as described below which includes the task "speak(Object+'is on'+Node)." Here, "Object" and "Node" are variables.

```
htn(tellLocation(Object),[
    location(Object,Node)
],[
    speak(Object+"is on"+Node)
]).
```

An execution of a task "sayHello" which instructs the mobile robot to say a greeting can be accomplished by providing a character string "Good morning" in voice output if the task is executed in the morning. Hence, a pre-execution condition "now(morning)" which means that now is the morning is added. Thus, the task "sayHello" (give a greeting) is disintegrated into tasks as described below including a task "speak('Good morning')."

```
htn(sayHello,[
    now(morning)
],[
    speak("Good morning")
]).
```

Similarly, if the task "sayHello" (give a greeting) is to be executed in the afternoon, audio output of a character string "Hello" is required. Then, a pre-execution condition "now(afternoon)" which means that now is the afternoon is added. Thus, the task "sayHello" (give a greeting) is disintegrated into tasks as described below including a task "speak('Hello')."

```
htn(sayHello,[
    now(afternoon)
],[
    speak("Hello")
]).
```

Similarly, if the task "sayHello" (give a greeting) is to be executed at night, audio output of a character string "Good night" is required. Hence, a pre-execution condition "now(night)" which means that now is the night is added. Thus, the task "sayHello" (give a greeting) is disintegrated into tasks described below including a task "speak('Good night')."

```
htn(sayHello,[
    now(night)
],[
    speak("Good night")
]).
```

When a task "explain(Object)" which instructs the mobile robot to give an explanation on an object ("Object") is given, an action of reading an explanation "Text" is executed, provided that the mobile robot is currently on node ("Node"), that the object ("Object") is on the node ("Node"), and that explanation of the object ("Object") is given as a text ("Text").

In other words, when three pre-execution conditions are fulfilled, i.e., "at(Node)" which means that the mobile robot is currently on the node ("Node"), "location(Object,Node)" which means that the object ("Object") is on the node ("Node"), and "contents(Object, Text)" which means that the explanation of the object ("Object") is given as a "Text" are fulfilled, the task can be accomplished by an execution of "speak(Text)" (reading the explanation ("Text")). Hence the task can be disintegrated into tasks as described below.

```
htn(explain(Object),[
    at(Node),
    location(Object,Node),
    contents(Object,Text)
],[
    speak(Text)
]).
```

When a pre-execution condition "at(Node)" (the mobile robot is currently on the node ("Node")) is fulfilled, execution of the task "goto(Node)" does not require an execution of any action. Hence, the task "goto(Node)" can be disintegrated into tasks as described below. In the description "Node" is a variable, and a state where there is no task to be executed is described as "[]."

```
htn(goto(Node),[
    at(Node)
],[
]).
```

For the execution of the task "goto(Node)" (move to a node ("Node")), a task "gotoNextNode(NextNode)" (move to a next node ("NextNode")) and a task "goto(Node)" (move to a node ("Node")) need to be executed sequentially. Hence the task is disintegrated into tasks as described below, where "Node" and "NextNode" are variables.

```
htn(goto(Node),[
],[
    gotoNextNode(NextNode),
    goto(Node)
]).
```

Next, a plan formulation process by the plan formulating unit 150 will be described in detail. Assume that the plan formulating unit 150 receives as a normal goal a task "show (exhibition1)" which instructs the mobile robot to go to a node where an object "exhibition1" resides and to deliver an explanation of the object "exhibition1," and formulates a plan for the task. The plan formulating unit 150 formulates a plan:

[goto(node2),explain(exhibition1)]

based on plan formulation knowledge:

```
htn(show(Object),[
    location(Object,Node)
],[
    goto(Node),
    explain(Object)
]).
``` and belief:

belief(location(exhibition1,node2)).

Then, a part "goto(node2)" of the formulated plan is disintegrated with the use of plan formulation knowledge:

```
htn(goto(Node),[
],[
    gotoNextNode(NextNode),
    goto(Node)
]).
``` to provide a following plan:

[gotoNextNode(NextNode),goto(node2),explain(exhibition1)
].

Here, "NextNode" is a variable not substituted for.

A pre-execution condition for the action "gotoNextNode (NextNode)" is satisfied from the plan formulation knowledge:

```
action(gotoNextNode(NextNode),[
    at(CurrentNode),
    connects(CurrentNode,NextNode)
],[
    terminates(at(CurrentNode)),
    initiates(at(NextNode))
]).
``` and two pieces of belief:
belief (at (node6)).
belief(connects(node6,node4)).
Further, as can be seen from the execution effect thereof:
terminates(at(node6)).
initiates(at(node4))., the mobile robot moves away from "node6" and arrives at "node4" as the current position.

Further, the belief DB 130 stores following information.
dy(at(_)).

It can be known that though the pre-execution condition "at(node6)" is fulfilled for the moment, true or false of the pre-execution condition may change in the future. Therefore, the true or false needs to be continuously checked in the future.

Hence, the plan formulating unit 150 substitutes "node4" for the variable "NextNode" and adds such information to the plan. Specifically, the plan formulating unit 150 adds description "action(gotoNextNode(node4))" as is shown below:

[precond([at(node6)]),
action(gotoNextNode(node4)),
effect([terminates(at(node6)),initiates(at(node4))]),
goto(node2),
explain(exhibition1)]

Here, "action(gotoNextNode(node4))" indicates that information on the pre-execution condition (the possibility of change of true or false in the future) and the execution effect are already added to the action "gotoNextNode(node4)."

There are plural nodes connected to the node "node6."Hence, there are plural manners of disintegration of the action "gotoNextNode(NextNode)." In the embodiment, the node "node4" which is closest to the final destination, i.e., the node "node2" is selected and substituted for "NextNode."

Next, the plan formulating unit 150 disintegrates the task "goto(node2)" based on following plan formulation knowledge:

```
htn(goto(GoalNode),[
    ],[
        gotoNextNode(NextNode),
        goto(Node)
    ]).
``` to elaborate the plan as below:
[precond([at(node6)]),
action(gotoNextNode(node4)),
effect([terminates(at(node6)),initiates(at(node4))]),
gotoNextNode(NextNode),
goto(node2)
explain(exhibition1)].

Then, the pre-execution condition and the execution effect of the action "gotoNextNode(NextNode)" are added to the plan according to the plan formulation knowledge:

```
action(gotoNextNode(NextNode),[
    at(CurrentNode),
    connects(CurrentNode,NextNode)
],[
    terminates(at(CurrentNode)),
    initiates(at(NextNode))
]).,
``` following belief:
belief(connects(node4,node2)).
dy(at(_))., and the execution effect "initiates(at(node4))" of the action as described in information added to the plan:
effect([terminates(at(node6)),initiates(at(node4))]), to obtain a following description:
precond([at(node6)])
action(gotoNextNode(node4)),
effect([terminates(at(node6)),initiates(at(node4))]),
precond([at(node4)]),
action(gotoNextNode(node2)),
effect([terminates(at(node4)),initiates(at(node2))]),
goto(node2),
explain(exhibition1)].
Further, according to following information on plan formulation:

```
htn(goto(Node),[
    at(Node)
],[
]).,
``` following belief:
dy(at(_))., and an execution effect "initiates(at(node2))" of the action described in information added to the plan:
effect([terminates(at(node4)),initiates(at(node2))]), it can be known that execution of any action is not required for the execution of the task "goto(node2)."
Hence, the plan formulating unit 150 disintegrates the task "goto(node2)" in the plan as described below and adds the pre-execution condition "at(node2)" which dynamically changes.

[precond([at(node6)])
action(gotoN, extNode(node4)),
effect([terminates(at(node6)),initiates(at(node4))]),
precond([at(node4)]),
action(gotoNextNode(node2)),
effect([terminates(at(node4)),initiates(at(node2))]),
precond([at(node2)]),
explain(exhibition1)]
Here, according to following information for plan formulation:

```
htn(explain(Object),[
    at(Node),
    location(Object,Node),
    contents(Object,Text)
],[
    speak(Text)
]).,
``` an effect of the action:
initiates(at(node2)) which is described in information added to the plan:
effect([terminates(at(node4)),initiates(at(node2))]), and following belief:
belief(location(exhibition1,node2)).
belief(contents(exhibition1,"This is the first Japanese Language word processor in the world."))., the task "explain(exhibition1)" in the plan can be rewritten as "speak("This is the first Japanese Language word processor in the world.")."
Further, from the belief:
dy(at(_)).
it can be known that the pre-execution condition "at(node2)" of the task "explain(exhibition1)" dynamically changes.
Then, the plan formulating unit 150 elaborates the plan as follows:
[precond([at(node6)]),
action(gotoNextNode(node4)),
effect([terminates(at(node6)),initiates(at(node4))]),
precond([at(node4)]),
action(gotoNextNode(node2)),
effect([terminates(at(node4)),initiates(at(node2))]),
precond([at(node2)]),
speak("This is the first Japanese Language word processor in the world.")]
Here, since the pre-execution condition "at(node2)" is already described in the pre-disintegration plan, it is not doubly described. However such pre-execution condition may be described again.
Further, according to following plan formulation knowledge:

```
action(speak(Text),[
    ],[
    ]).,
``` a pre-execution condition (none), and an execution effect (none) of "speak('This is the first Japanese Language word processor in the world.')" are added to the plan.
[precond([at(node6)]),
action(gotoNextNode(node4)),
effect([terminates(at(node6)),initiates(at(node4))]),
precond([at(node4)]),
action(gotoNextNode(node2)), effect([terminates(at(node4)),initiates(at(node2))]),
precond([at(node2)]),
action(speak("This is the first Japanese Language word processor in the world.")),
effect([])].

Thus, the plan can be formulated as not to include an abstract task which is not an action. The finished plan includes pre-execution conditions and execution effects that dynamically change added for every action. The plan thus completed by the above-described process is stored in the interrupting plan DB 162 in the plan DB controlling unit 160.

Figure 5:
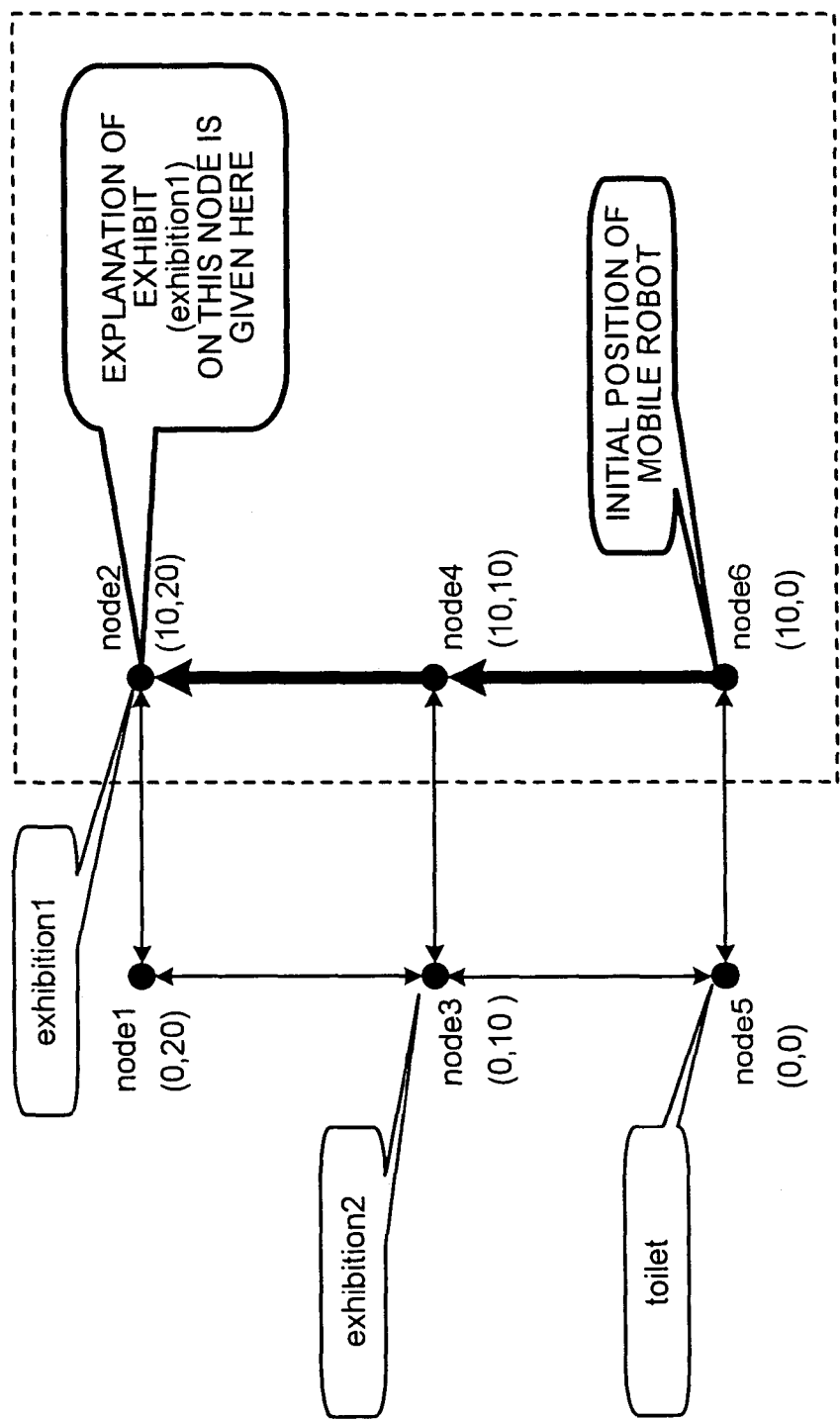
FIG. 5 is a schematic diagram of a plan formulated by the plan formulating unit.

FIG. 5 is a schematic diagram of a completed plan. As shown in FIG. 5, according to the finished plan, the mobile robot first moves from node6, which is an initial position, to node4, and subsequently moves from node4 to node2. On node2, the mobile robot delivers an explanation of the exhibit. Thus, the plan formulating unit 150 can formulate a plan with plural actions based on a provided goal.

Figure 6:
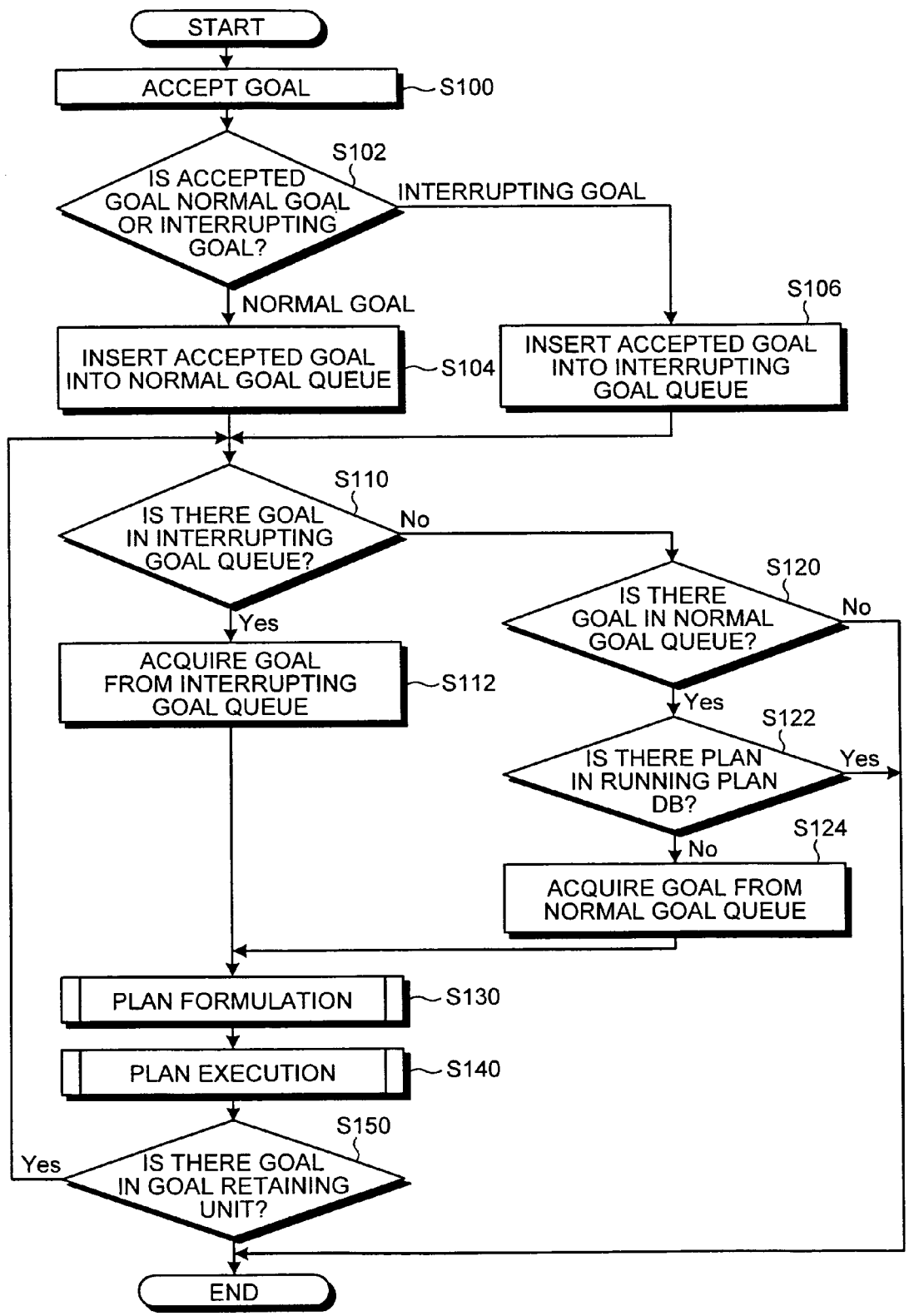
FIG. 6 is a flowchart of a plan execution process performed at an execution of a plan by the mobile robot according to the embodiment.

FIG. 6 is a flowchart of a plan execution process at an execution of a plan by the mobile robot 10 according to the embodiment. First, the goal accepting unit 100 acquires a goal (step S100). Then, the goal accepting unit 100 determines a type of the acquired goal. Specifically, the goal accepting unit 100 determines whether the acquired goal is a normal goal or an interrupting goal.

When the acquired goal is a normal goal (Normal goal, step S102), the goal accepting unit 100 inserts the acquired normal goal to an end of the normal goal queue 114 of the goal retaining unit 110 (step S104). On the other hand, when the acquired goal is an interrupting goal (Interrupting goal, step S102), the goal accepting unit 100 inserts the acquired interrupting goal to an end of the interrupting goal queue 112 of the goal retaining unit 110 (step S106).

Next, the execution controlling unit 120 confirms whether an interrupting goal exists in the interrupting goal queue 112 of the goal retaining unit 110 or not. When there is an interrupting goal (Yes in step S110), the execution managing unit 120 takes out a first interrupting goal in the interrupting goal queue 112 (step S112). On the other hand, when there is no interrupting goal (No in step S110), the execution managing unit 120 further confirms whether a normal goal exists in the normal goal queue 114 or not. When there is a normal goal (Yes in step S120), the execution managing unit 120 further confirms whether a plan exists in the running plan DB 164 or not. When there is no plan (No in step S122), the plan formulating unit 150 takes out a goal from the normal goal queue 114 (step S124).

Then, the plan formulating unit 150 formulates a plan corresponding to the goal taken out from the normal goal queue 114 (step S130). The action executing unit 170, under the control of the plan DB controlling unit 160, executes the plan stored in the running plan DB 164 action by action (step S140). When there is a goal in the goal retaining unit 110 (Yes in step S150), the action executing unit 170 returns to step S110. When there is no goal in the goal retaining unit 110 (No in step S150), the plan execution process completes.

On the other hand, when there is no normal goal in the normal goal queue 114 at step S120 (No in step S120), the process ends. When there is a plan in the running plan DB 164 at step S122 (Yes in step S122), the process ends.

Figure 7:
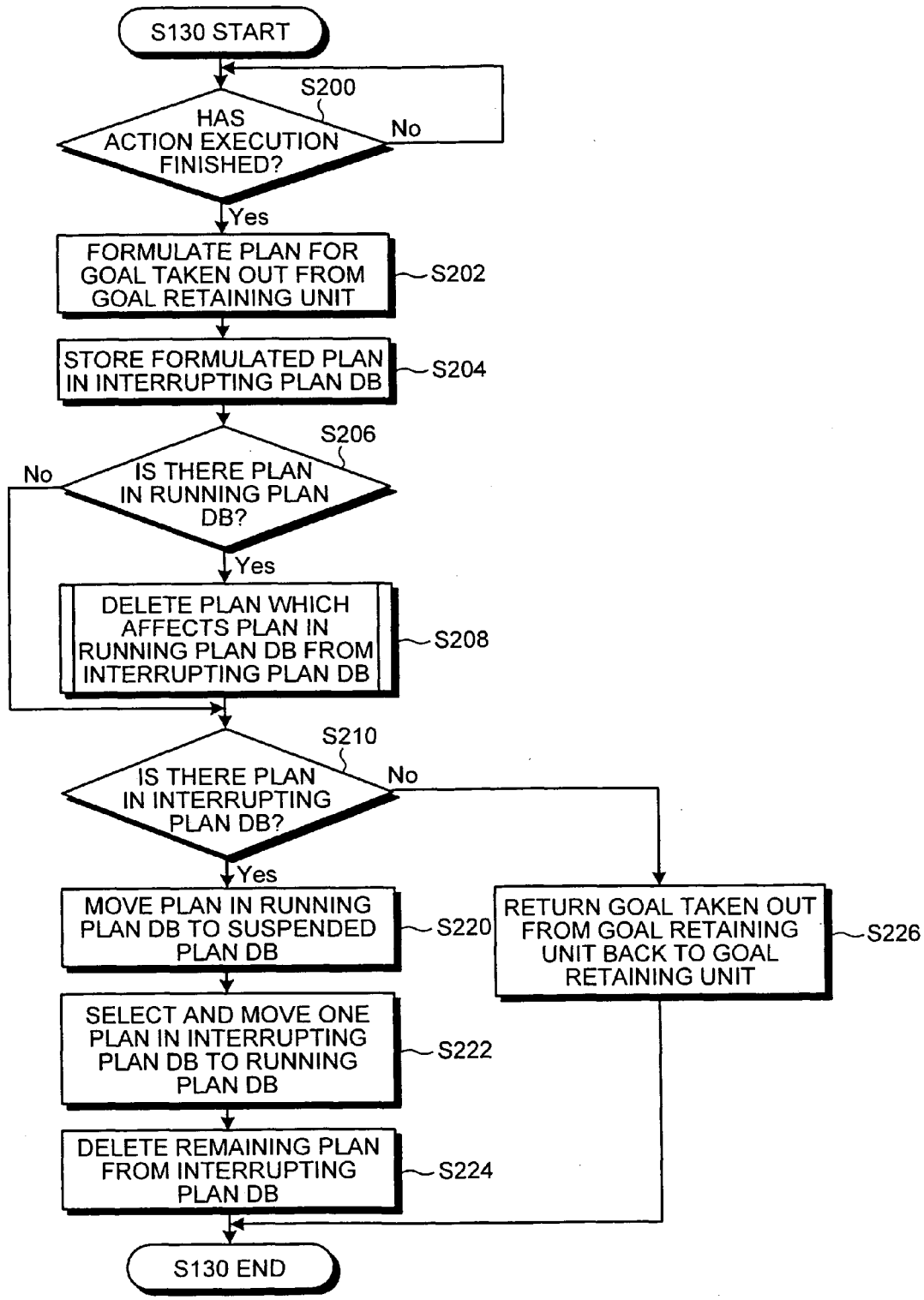
FIG. 7 is a detailed flowchart of a plan formulation process (step S130) shown in FIG. 6.

FIG. 7 is a flowchart of a detailed process of the plan formulation process (step S130) described with reference to FIG. 6. When the action is being executed by the action executing unit 170 at a timing of plan formulation by the plan formulating unit 150, the plan formulating unit 150 stands by until the execution of the action completes.

When the execution of the action completes (Yes in step S200), the plan formulating unit 150 formulates plural plans corresponding to an interrupting goal taken out from the interrupting goal queue 112 in step S112 or a normal goal taken out from the normal goal queue 114 in step S124 (step S202). Then, the plan formulating unit 150 stores the formulated plans in the interrupting plan DB 162 (step S204).

Then, the plan DB controlling unit 160 confirms whether there is a plan in the running plan DB 164 or not. When there is a plan (Yes in step S206), the plan DB controlling unit 160 deletes a plan which execution affects a plan stored in the running plan DB 164 among plans stored in the interrupting plan DB 162 (step S208). The process here will be described later further in detail.

The plan DB controlling unit 160 confirms whether there is an interrupting plan in the interrupting plan DB 162 or not. When there is an interrupting plan (Yes in step S210), the plan DB controlling unit 160 moves a plan in the running plan DB 164 to the suspended plan DB 166 (step S220). In other words, the plan DB controlling unit 160 temporarily saves the plan in execution.

Then, the plan DB controlling unit 160 moves the plan in the interrupting plan DB 162 to the running plan DB 164 (step S222). Here, when there are plural plans stored in the interrupting plan DB 162, one plan is selected and moved to the running plan DB 164. Any plan in the interrupting plan DB 162 may be selected.

Alternatively, a plan may be selected preferentially if the plan does not include an action which pre-execution condition and execution effect change, for example.

When the interrupting plan DB 162 stores plural plans in step S220, plans other than the selected plan in step S220 are deleted from the running plan DB 164 (step S224). Then the process proceeds to step S140.

On the other hand, when there is no plan in the interrupting plan DB 162 in step S210 (No in step S210), the goal taken out from the goal retaining unit 110 is returned to its original position in the original queue in the goal retaining unit 110 (step S226). Then the process proceeds to step S140. In other words, when a formulated interrupting plan affects the plan stored in the running plan DB 164, such interrupting plan is not executed.

Alternatively, when there is no plan in the interrupting plan DB 162 (No in step S210), the interrupting goal taken out from the goal retaining unit 110 may be deleted. Thus, when the formulated plan affects the plan in execution, such plan may be discarded by the deletion of the goal.

Figure 8:
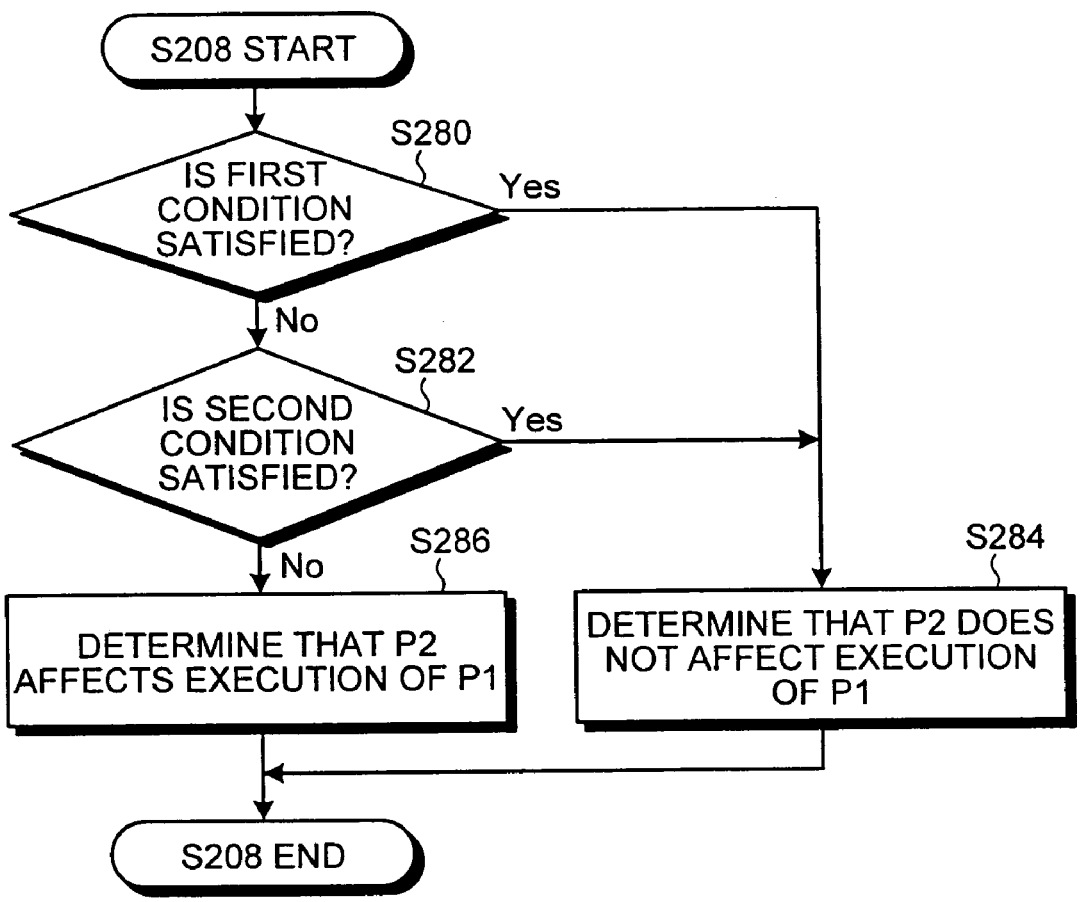
FIG. 8 is a flowchart of the influencing plan selection process, in which a plan that affects a plan in execution is selected, shown as step S208 in FIG. 7.

FIG. 8 is a flowchart of an influencing plan selection process in step S208 in which a plan which affects a plan in execution is selected as described with reference to FIG. 7. A plan (hereinafter referred to as a first plan) "P1" stored in the running plan DB 164 includes an action "A1x" and another plan (hereinafter referred to as a second plan) "P2" includes an action "A2x." A pre-execution condition of "A1x" is compared with an execution effect of "A2x." Based on the result of comparison, it is determined whether the mobile robot is in a state which satisfies a first condition or a second condition. The first and the second conditions will be described later.

Here, it is presupposed that when an execution of an action stored in the running plan DB 164 is completed, such action is deleted from the running plan DB 164.

When the first condition is met (Yes in step S280), it is determined that the second action does not affect the execution of the first action (step S284). When the second condition is met (Yes in step 282), similarly, the second action is determined not to affect the execution of the first action (Step S284). Otherwise (No in step S280, No in step S282), the second action is determined to affect the execution of the first action (step S286).

Figure 9:
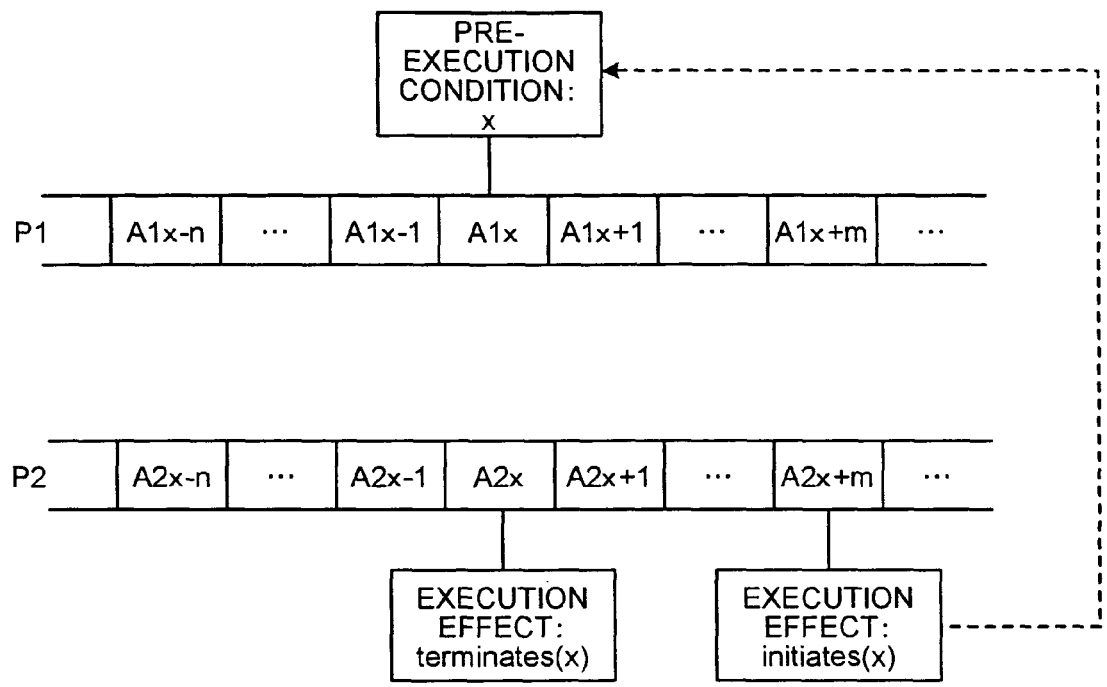
FIG. 9 is an explanatory diagram of a first condition.

FIG. 9 is a diagram for an explanation of the first condition. Here, the first plan "P1" is assumed to include the action "A1x" which pre-execution condition is indicated by "X." The first condition includes two parts: first is that there is the action "A2x" which has an execution effect "terminates(X)" that ends the pre-execution condition "X" of the action "A1x"; second is that there is an action "A2x+m" subsequent to the action "A2x," and the action "A2x+m" has the execution effect "initiates(X)" that starts the pre-execution condition "X."

Thus, when there is an action which has an execution effect to end "X" in the second plan "P2," if there is an action having an execution effect "initiates(X)" which starts "X," the pre-execution condition "X" is satisfied at a timing immediately before execution of the action "A2x." Hence, the second plan "P2" which is newly stored in the interrupting plan DB 162 is determined not to affect the first plan "P1" in execution.

Figure 10:
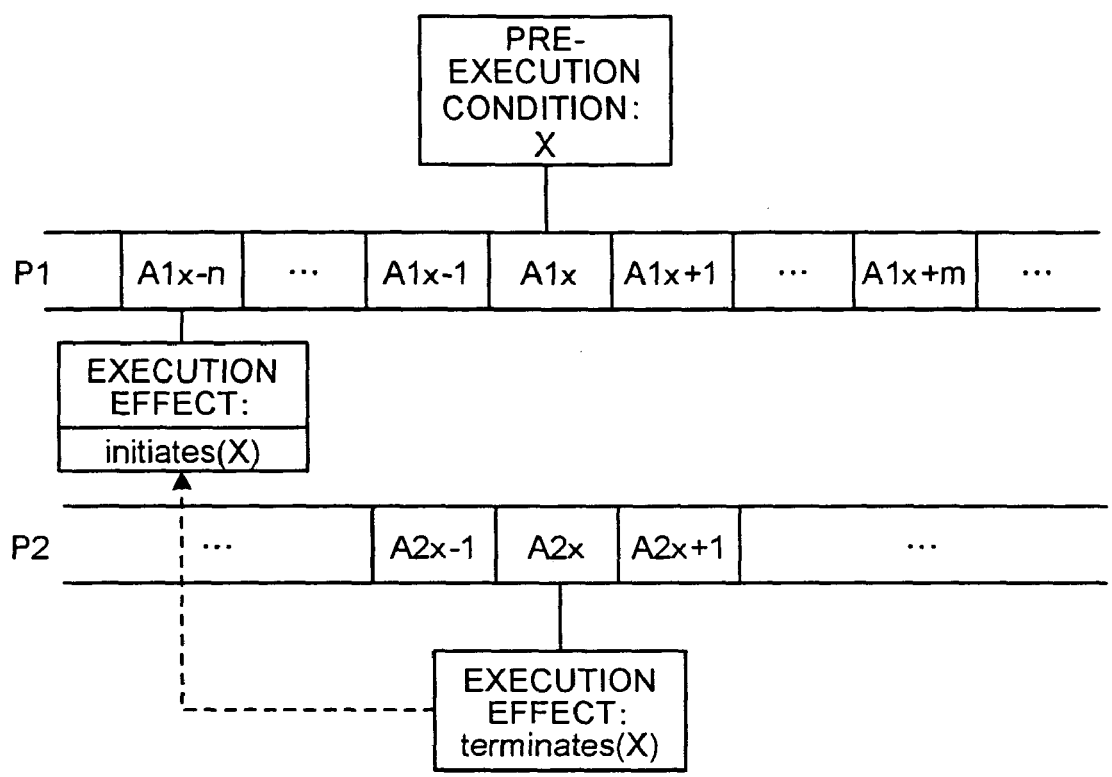
FIG. 10 is an explanatory diagram of a second condition.

FIG. 10 is a diagram for an explanation of the second condition. The second condition includes two parts: first is that, similarly to the first condition, there is the action "A2x" which has an execution effect "terminates(X)" to end the pre-execution condition "X" of the action "A1x"; second is that there is an action "A1x−n" which is executed prior to the execution of the action "A1x" of the first plan "P1" and that the action "A1x−n" has an execution effect "initiates(X)" to start "X."

Thus, even when there is an action which has an execution effect to end "X" in the second plan "P2," if there is an action which has the execution effect "initiates(X)" to start "X" as an action to be executed prior to the action "A1x" in the first plan "P1," the pre-execution condition "X" is satisfied immediately before the execution of the action "A2x." Hence, in such case, the second plan "P2" newly store in the interrupting plan DB 162 is determined not to affect the first plan "P1" in execution.

Further, though not shown in FIG. 8, when an execution effect of each action included in the second plan is not defined, such plan is determined not to affect the first plan, since if the execution effect is not defined, the execution of the second plan is not accompanied with a change in state, therefore does not affect the first plan.

Further, the timing of the execution of the interrupting plan is immediately after the action currently in execution. However, if the execution immediately after the action currently in execution affects the plan in execution, and if the execution after another action which executed after the currently executed action does not affect the currently executed action, the interrupt may be executed at such timing. The determination on the timing is performed according to the process as described with reference to FIGS. 8 to 10.

Figure 11:
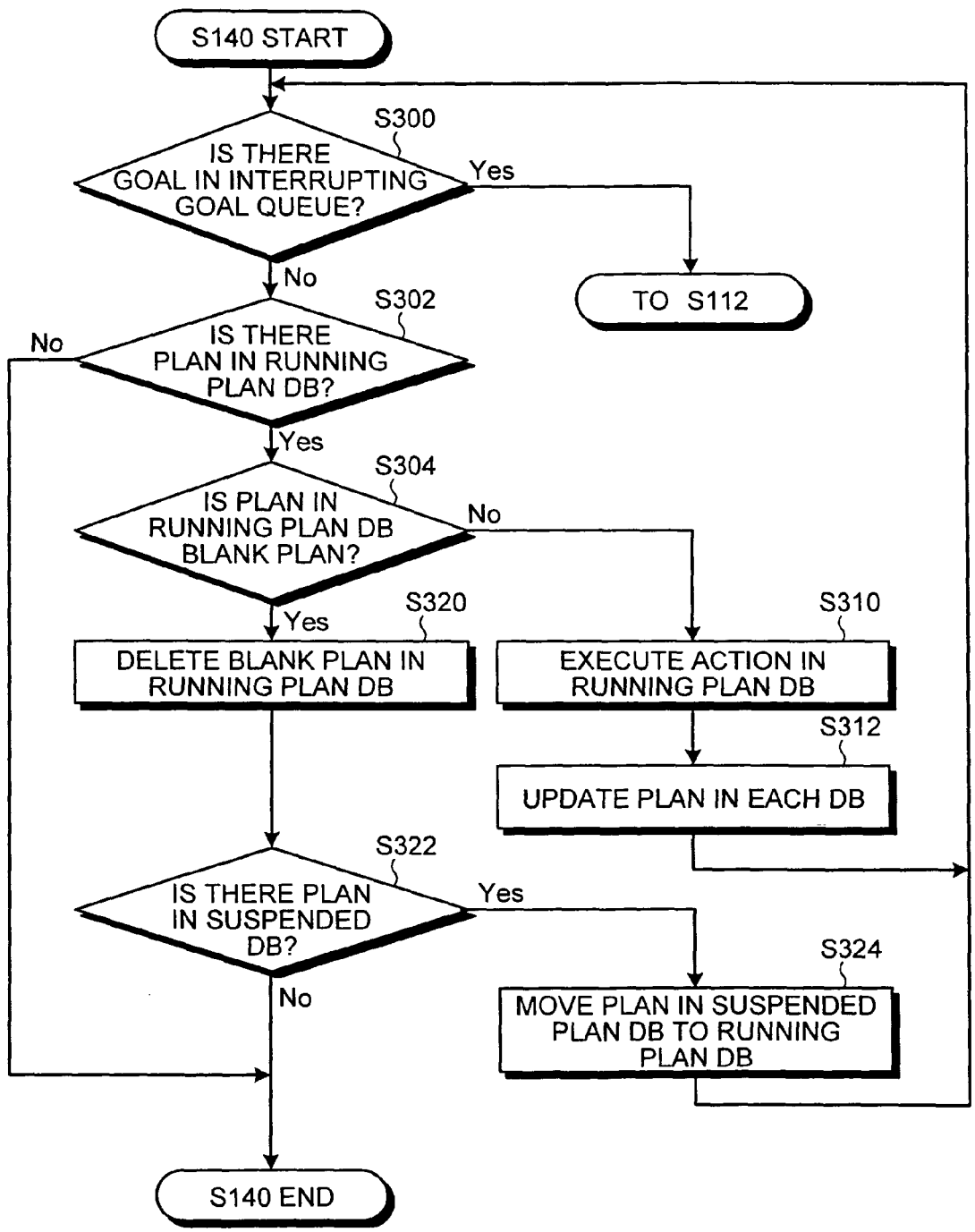
FIG. 11 is a detailed flowchart of the plan execution process (step S140) shown in FIG. 6.

FIG. 11 is a flowchart of a detailed process of the plan execution process (step S140) described with reference to FIG. 6. In the plan execution process, first the execution managing unit 120 confirms whether there is an interrupting goal in the interrupting goal queue 112 or not (Step S300). When there is an interrupting goal (Yes in step S300), the execution managing unit 120 proceeds to step S112.

Then, the execution managing unit 120 confirms whether there is a plan in execution in the running plan DB 164 or not. When there is a plan in execution (Yes in step S302), the execution managing unit 120 confirms whether the plan is a blank plan or not. If the plan is not a blank plan (No in step S304), the action executing unit 170 executes an action included in the plan in the running plan DB 164 (step S310).

The execution managing unit 120 then updates each of DB 162, 164, 166 in the plan DB controlling unit 160 and the belief DB 130 (step S312). Then the execution managing unit 120 returns to step S300.

On the other hand, when the plan in the running plan DB 164 is determined to be a blank plan in step S304 (Yes in step S304), the plan DB controlling unit 160 deletes the blank plan in the running plan DB 164 (step S320).

The plan DB controlling unit 160 then confirms whether there is a suspended plan stored in the suspended plan DB 166 or not. When there is a suspended plan (Yes in step S322), the plan DB controlling unit 160 moves the suspended plan stored in the suspended plan DB 166 to the running plan DB 164 as a plan to be executed next (step S324). Then the plan DB controlling unit 160 returns to step S300.

On the other hand, when it is determined that there is no suspended plan in step S322 (No in step S322), the plan execution process ends. Further, when there is no plan in the running plan DB 164 in step S302 (No in step S302), the plan execution process ends.

The plan execution process which is described with reference to FIGS. 6 to 11 so far will be more specifically described. Here, a specific process will be described where the mobile robot 10 acquires an interrupting goal during an execution of a plan for a task "show(exhibition1)" as described below.

[precond([at(node6)]),
action(gotoNextNode(node4)),
effect([terminates(at(node6)),initiates(at(node4))]),
precond([at(node4)]),
action(gotoNextNode(node2)),
effect([terminates(at(node4)),initiates(at(node2))]),
precond([at(node2)]),
action(speak("This is the first Japanese Language word processor in the world.")),
effect([]).

First, the action executing unit 170 executes a following action according to the plan:

gotoNextNode(node4).

Subsequently to the execution of the action, the action executing unit 170 replaces belief "belief(at(node6))" in the plan formulation knowledge DB 140 with "belief(at(node4))" according to the execution effect "effect([terminates(at(node6)),initiates(at(node4))])" of the action added to the plan. Thereafter the plan formulating unit 150 rewrites the plan as described below.

[precond([at(node4)]),
action(gotoNextNode(node2)),
effect([terminates(at(node4)),initiates(at(node2))]),
precond([at(node2)]),
action(speak("This is the first Japanese Language word processor in the world.")),
effect([])].

Figure 12:
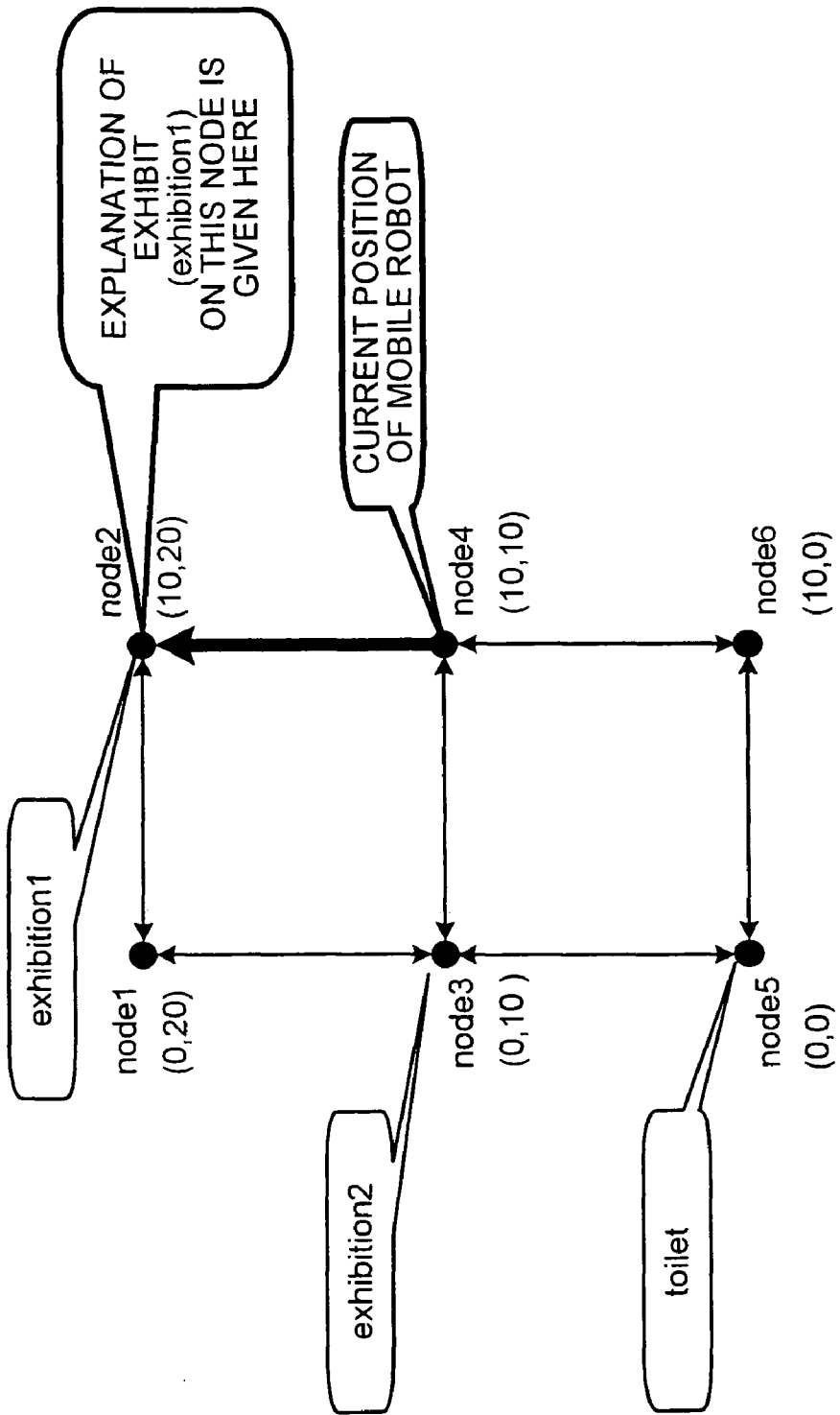
FIG. 12 is a schematic diagram of an exemplary plan.

FIG. 12 is a schematic diagram of the plan. Since the action "gotoNextNode(node4)" has been executed, the mobile robot 10 is currently on node4. Plan formulation knowledge indicating that the mobile robot 10 is currently on node4 is newly stored in the plan formulation knowledge DB 140. Hence, the plan formulating unit 150, as shown in FIG. 12, sets node4 as the initial state of the mobile robot and newly formulates a plan for moving from the current state to node2.

Here, assume that the goal accepting unit 100 acquires "show(exhibition2)" as a normal goal from the outside. Then, the acquired goal is inserted to the end of the normal goal queue 114 as a normal goal (step S102, normal goal, step S104).

Here, there is no interrupting goal in the interrupting goal queue 112 (No in step S110). In addition, there is a goal in the normal goal queue 114 (Yes in step S120), and a plan to explain the exhibit at node2 is stored in the running plan DB 164 (Yes in step S122). Hence, the plan corresponding to "show(exhibition2)" is executed after the completion of the execution of the plan currently in execution.

Further, assume that the goal accepting unit 100 acquires "sayHello" as an interrupting goal from the outside. Then, the acquired goal is inserted to the end of the interrupting goal queue 112 as an interrupting goal (step S102, interrupting goal, step S106). Here, since there is an interrupting goal in the interrupting goal queue 112 (Yes in step S110), the execution managing unit 120 instructs the formation of a plan to the plan formulating unit 150.

Then the plan formulating unit 150 takes out the interrupting goal from the interrupting goal queue 112 and formulates the plan therefor (step S130).

Specifically, based on plan formulation knowledge instructing to say "Good morning" in the morning which stored in the plan formulation knowledge DB 140:

htn(sayHello,[
    now(morning)
],[
    speak("Good morning")
]).

and belief stored in the belief DB 130 and indicating that though it is currently in the morning, true or false may change:
    belief(now(morning)).
    dy(now(_))., the plan formulating unit 150 formulates a following plan:
    [precond([now(morning)]),speak("Good morning")].

Further, the plan formulating unit 150 changes based on plan formulation knowledge related to a following execution effect:

action(speak(Text),[
    ],[
    ]))., a previously formulated plan into a following plan:
    [precond([now(morning)]),action(speak("Good morning")),effect([]).

Thus, the plan is completed (step S202).

Figure 13:
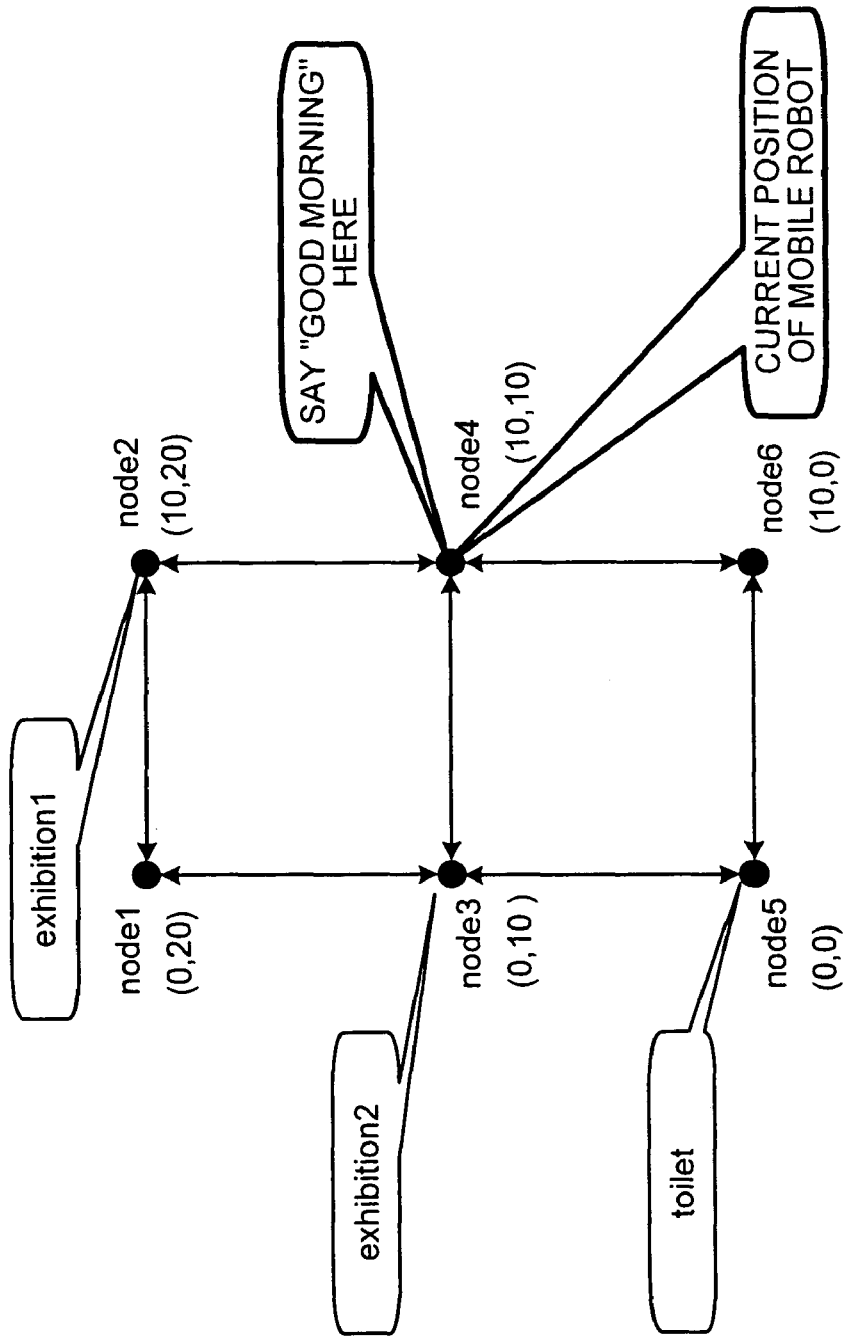
FIG. 13 is a schematic diagram of a formulated plan.

Then, the plan formulating unit 150 stores the formulated plan into the interrupting plan DB 162 (step S204). FIG. 13 is a schematic diagram of the formulated plan. Thus, the plan to make the mobile robot 10 say "Good morning" at the current location is formulated.

Here, since the running plan DB 164 already stores the plan in execution (Yes in step S206), the execution managing unit 120 determines whether the formulated plan affects the executed plan or not (step S208).

The execution effect to the action included in the interrupting goal is not defined. In other words, the interrupting plan does not affect the plan currently in execution. Hence the interrupting plan is left in the interrupting plan DB 162 (step S208).

Since there is an interrupting plan in the interrupting plan DB 162 (Yes in step S210), the plan DB controlling unit 160 moves the plan stored in the running plan DB 164 to the suspended plan DB 166 (step S220). Further, the plan DB controlling unit 160 moves the plan stored in the interrupting plan DB 162 to the running plan DB 164 (step S222). Since there is only one plan stored in the interrupting DB 162, the plan formulation process (Step S130) ends here. Thus, the execution managing unit 120 preferentially executes the interrupting plan prior to the plan in execution when the interrupting plan does not affect the executed plan.

Here, since there is no interrupting goal in the interrupting goal queue 112 (No in step S300) and there is a plan which is not a blank plan in the running plan DB 164 (Yes in step S302, No in step S304), the plan stored in the running plan DB 164 is executed (step S310).

Specifically, the action executing unit 170 executes an action "speak("Good morning")" according to a plan newly stored in the running plan DB 164:
    [precond([now(morning)]),action(speak("Good morning")),effect([])].

The action does not have an execution effect as shown by "effect([])." Hence the belief stored in the belief DB 130 is not updated.

Then, the plan stored in the running plan DB 164 is updated as follows (step S312). In other words, the plan is changed to a blank plan.
    []

Then the process returns to step S300. Here, since there is only a blank plan stored in the running plan DB 164 (No in step S300, Yes in step S302, and Yes in step S304), the plan DB controlling unit 160 deletes a blank plan (step S320). Since the plan is now a blank plan, the completion of the execution of the plan can be confirmed.

Further, since the suspended plan is stored in the suspended plan DB 166 at the time (Yes in step S322), the plan stored in the suspended plan DB 166 is moved to the running plan DB 164 (step S324). Then the process returns to step S300 and the normal plan is executed.

Specifically, the execution managing unit 120 resumes the execution of the suspended plan (see FIG. 12).

The suspended plan is described as follows.
    [precond([at(node4)])
    action(gotoNextNode(node2)),
    effect([terminates(at(node4)),initiates(at(node2))]),
    precond([at(node2)]),
    action(speak("This is the first Japanese Language word processor in the world.")),
    effect([])].

The action executing unit 170, following the plan stored in the running plan DB 164 first, executes "gotoNextNode (node2)." Then, the action executing unit 170 replaces the belief "at(node4)" stored in the belief DB 130 with "at (node2)." Further, the action executing unit 170 updates the plan stored in the running plan DB 164 as follows.
    [precond([at(node2)]),
    action(speak("This is the first Japanese Language word processor in the world.")),
    effect([])].

Figure 14:
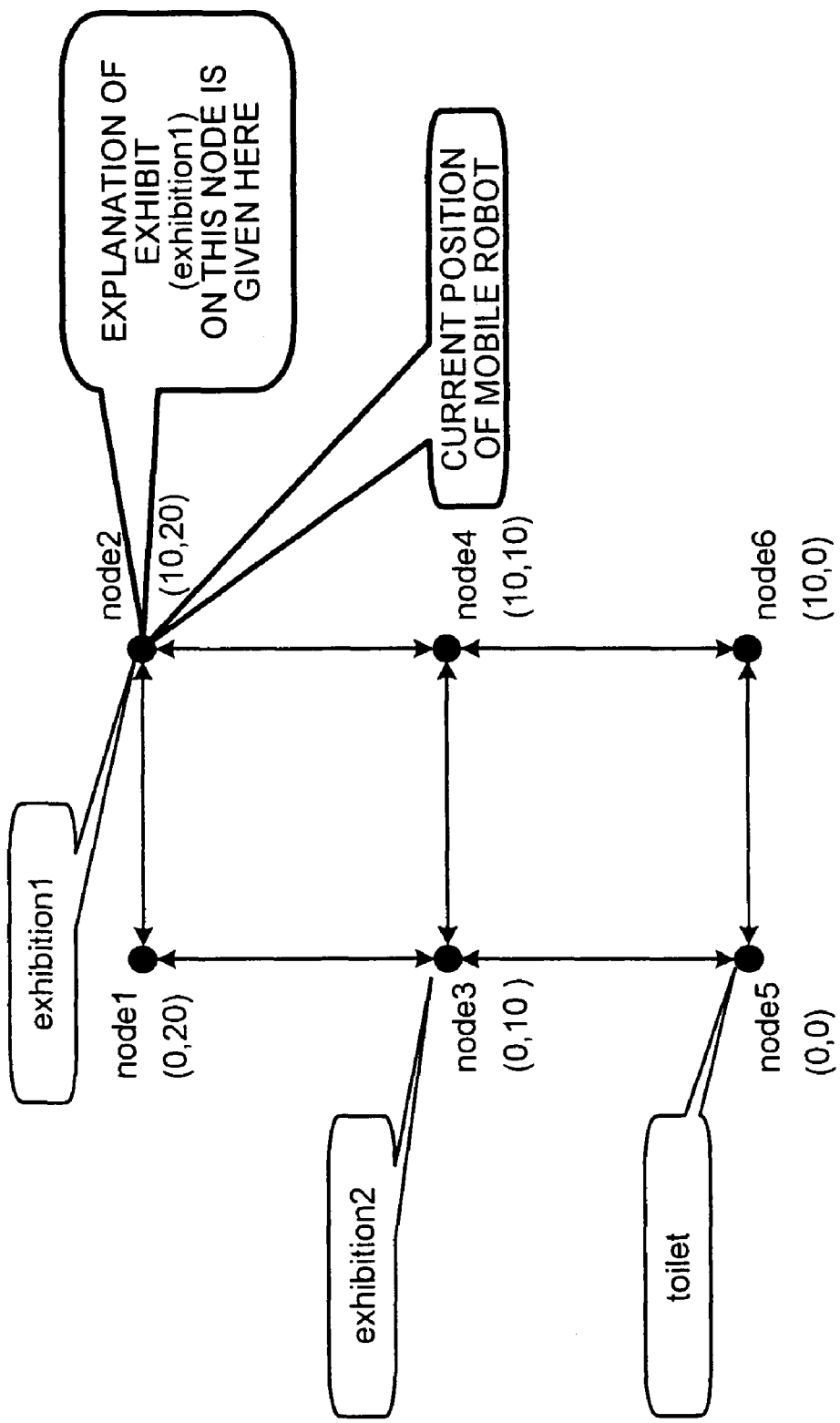
FIG. 14 is a schematic diagram of an updated plan.

FIG. 14 is a schematic diagram of the updated plan. Since the current position of the mobile robot is node2, the plan is updated as to instruct to explain "This is the first Japanese Language word processor in the world." at node2.

Further, assume that the goal accepting unit 100 acquires an interrupting goal "guide(toilet)" from the outside at this timing (step S100). Then, since the acquired goal is an interrupting goal (interrupting goal in step S102) the acquired goal is inserted to the end of the interrupting goal queue 112 (Step S106). Since the interrupting goal exists in the interrupting goal queue 112 (Yes in step S110), the plan formulating unit 150 takes out the interrupting goal (step S112), and formulates a corresponding plan (step S130).

Specifically, the action executing unit 170, based on following plan formulation knowledge:

```
htn(guide(Object),[
],[
    show(Object)
]).
``` formulates a following first plan:
  [show(toilet)].

Further the action executing unit 170, based on following plan formulation knowledge:

```
htn(guide(Object),[
],[
    tellLocation(Object)
]).
``` formulates a following second plan:
  [tellLocation(toilet)]

Thus, two plans are formulated for the same interrupting goal.

These plans are elaborated into following plans, respectively, according to the same process as the plan formulation process described above. Thus, the plan formulating unit 150 formulates two plans (step S202).

[precond([at(node2)]),
  action(gotoNextNode(node4)),
  effect([terminates(at(node2)),initiates(at(node4))]),
  precond([at(node4)]),
  action(gotoNextNode(node6)),
  effect([terminates(at(node4)),initiates(at(node6))]),
  precond([at(node6)]),
  action(gotoNextNode(node5)),
  effect([terminates(at(node6)),initiates(at(node5))]),
  precond([at(node5)]),
  action(speak("Here is a toilet.")),
  effect([])].
  [precond([])
  action(speak("Toilet is on node5")),
  effect([])].

Figure 15:
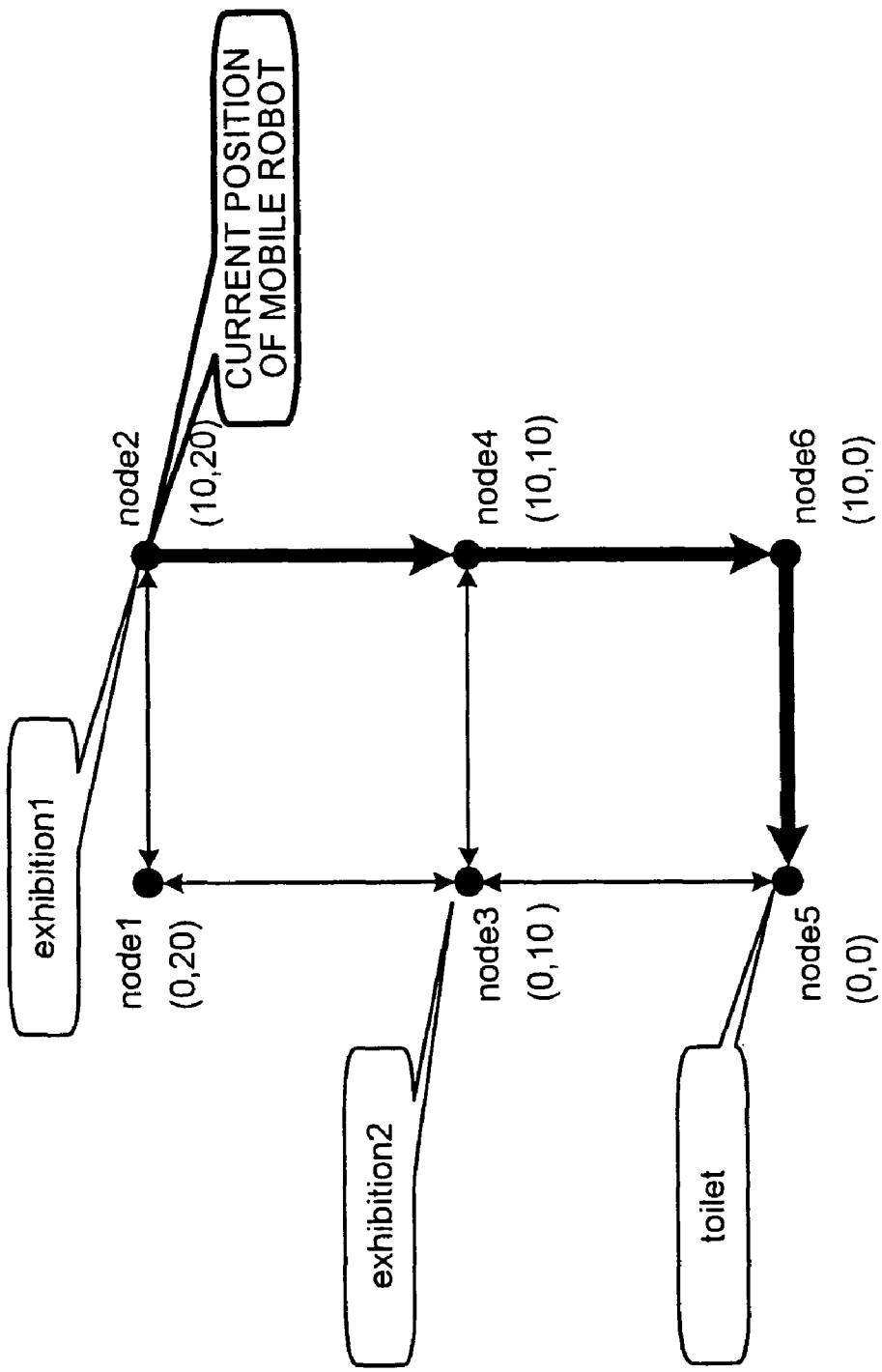
FIG. 15 is a schematic diagram of a first plan.
Figure 16:
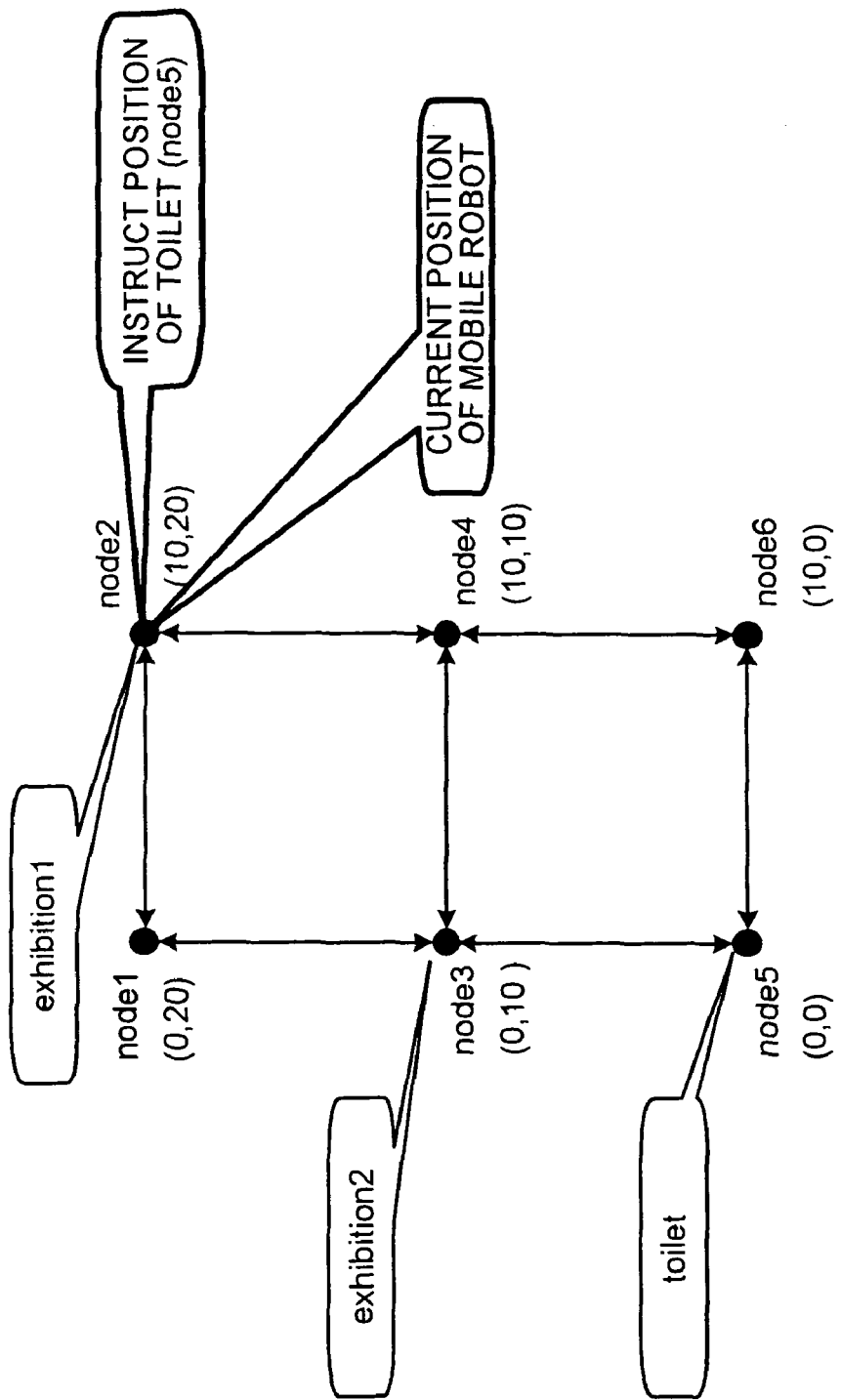
FIG. 16 is a schematic diagram of a second plan.

FIG. 15 is a schematic diagram of the first plan. Thus, the first plan is a plan to move the mobile robot from node2 to the toilet via node4 and node6. FIG. 16 is a schematic diagram of the second plan. The second plan is a plan to give guidance on the location of the toilet at node2.

The plan formulating unit 150 stores these two plans in the interrupting plan DB 162 (step S204). Here, the running plan DB 164 stores the plan in execution (Yes in step S206). Hence, the execution managing unit 120 determines whether two plans formulated by the plan formulating unit 150 affects the plan in execution or not.

The executed plan "speak("This is the first Japanese Language word processor in the world.")" corresponds with pre-execution condition "precond([at(node2)])." Hence, "at (node2)" must be fulfilled immediately before the execution of the plan. With regard to the first plan, since the mobile robot moves to node5 for the completion of the process, the pre-execution condition "precond([at(node2)])" cannot be satisfied. On the other hand, the second plan does not have an execution effect and satisfies the pre-execution condition "precond([at(node2)])." Hence the first plan is deleted whereas the second plan is left (step S208).

Thus, the second plan exists in the interrupting plan DB 162 (Yes in step S210). Hence, the plan in execution stored in the running plan DB 164 is moved to the suspended plan DB 166 (step S220). Then, the second plan in the interrupting plan DB 162 is moved to running plan DB 164 (step S222). Since there is no plan left in the interrupting plan DB 162, the plan formulation process completes.

Thus, since the plan which does not satisfy the pre-execution condition of the plan in execution is deleted in the embodiment, such plan is not executed. Hence, only an appropriate plan is executed as an interrupt.

Next, the second plan newly stored in the running plan DB 164 is executed (step S140). Specifically, according to the second plan:

```
[precond([ ]),
    action(speak("Toilet is on node5.")),
    effect([ ])],
``` an action:
  (speak("Toilet is on node5.") is executed.

The action does not have an execution effect as shown by "effect([])." Hence, the belief stored in the belief DB 130 is not updated.

Next, the plan stored in the running plan DB 164 is updated as follows (step S312). In other words, the plan is changed into a blank plan:
  [].

Then, the process returns to step S300 again. Here, since only a blank plan is stored in the running plan DB 164 (No in step S300, Yes in step S302, Yes in step S304), the plan DB controlling unit 160 deletes the blank plan (Step S320).

Further, since a suspended plan is stored in the suspended plan DB 166 (Yes in step S322), the plan stored in the suspended plan DB 166 is moved to the running plan DB 164 (step S324). Then, the process returns to step S300 again and a normal plan is executed.

Specifically, the execution managing unit 120 resumes the execution of the suspended plan (see FIG. 14). The suspended plan is described as follows.

[precond([at(node2)]),
  action(speak("This is the first Japanese Language word processor in the world."))
  effect([])].

The action executing unit 170 first, following the plan stored in the running plan DB 164, executes an action "speak ("This is the first Japanese Language word processor in the world.")." This action does not have an execution effect as shown by "effect([])." Hence the belief DB 130 is not updated.

Next, the plan stored in the running plan DB 164 is updated as follows:
  [].

Since the plan is now a blank plan, it means that the execution of the plan is securely completed. Then, the plan DB controlling unit 160 deletes the blank plan from the running plan DB 164.

Further, when the plan does not exist in the plan DB controlling unit 160 and only one normal goal "show(exhibition2)" exists in the normal goal queue 114 (Yes in step S120, No in step S122), the plan formulating unit 150 takes out the normal goal stored in the normal goal queue 114 (step S124) and formulates a plan corresponding to the normal goal (step S130). Then the formulated plan is executed (step S140).

Figure 17:
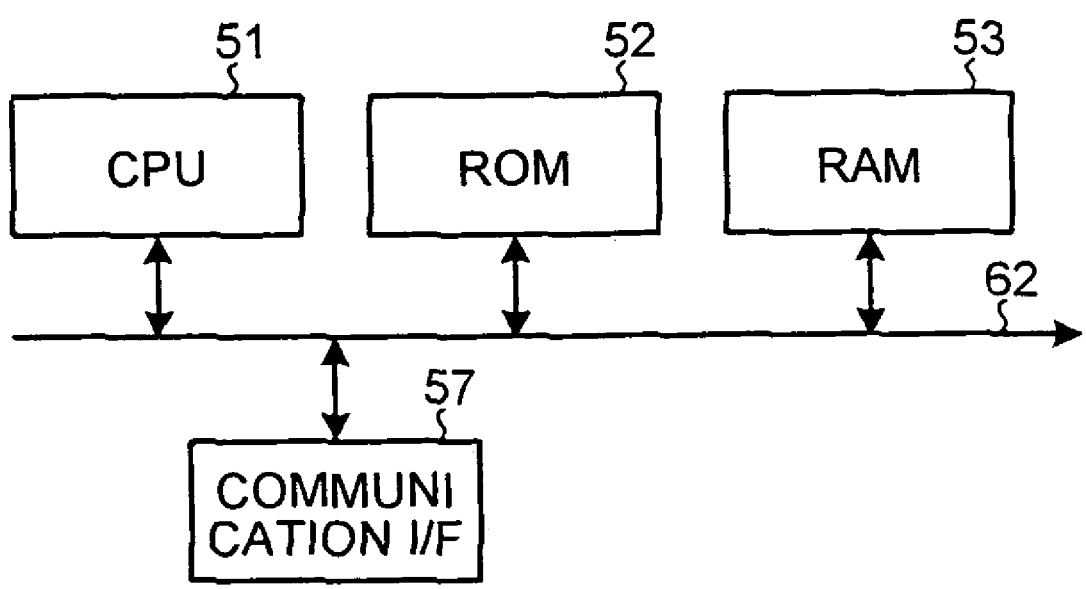
FIG. 17 is a diagram of a hardware structure of the mobile robot according to the embodiment.

FIG. 17 is a diagram of a hardware structure of the mobile robot 10 according to the embodiment. The mobile robot 10 includes, as a hardware structure, a read only memory (ROM) 52 which stores a plan execution program or the like for execution of the plan execution process in the mobile robot 10, a central processing unit (CPU) 51 which controls respective units in the mobile robot 10 according to the program stored in the ROM 52, a random access memory (RAM) 53 which stores various necessary data for the control of the mobile robot 10, a communication interface (I/F) 57 which realizes communication via connection with a network, and a bus 62 which connects respective units.

The plan execution program of the mobile robot 10 as described above may be recorded in a computer readable recording medium such as a CD-ROM, a floppy disk (FD), a digital versatile disk (DVD) or the like in an installable or an executable format file for provision.

Then, the plan execution program is read out from the recording medium at the mobile robot 10 and executed to be loaded on to a main memory thereby respective units described above in the description of software are generated on the main memory.

Further, the plan execution program according to the embodiment may be stored in a computer connected to a network such as the Internet and downloaded via the network for provision.

Thus, though the exemplary embodiment of the present invention is described above, various modifications and improvements can be added to the embodiment.

For example, though the mobile robot incorporating the plan executing apparatus is described as the embodiment, the plan executing apparatus may be applied to objects other than the mobile robot. For example, a plan relating to inventory management of goods can be executed with such plan executing apparatus as a first modification of the embodiment. The change in the inventory may be represented as the belief information, whereby the interrupting plan can be properly executed according to the number of goods sent out and sent in to the inventory.

Thus, even when the state of the object which is a target of the plan changes and the change affect the possibility of the execution of the plan, the plan executing apparatus according to the embodiment can properly executes the interrupting plan through the management of the plan execution based on the state of the object.

A second modification is described. In the embodiment, as described with reference to FIGS. 8 to 10, even when some action realized as the interrupting plan changes the state of the object so as not to satisfy the pre-execution condition, such action is determined to be an action which does not affect the plan in execution as far as the pre-execution condition is satisfied immediately prior to the execution of the plan in execution. However, it is also possible to prohibit the interrupt when the action included in the interrupting plan changes the state of the object to a different state which does not satisfy the pre-execution condition. Then, it is possible to eliminate a process step of determining whether the state which does not satisfy the pre-execution condition will recover to a state which satisfies the pre-execution condition or not.

A third modification is described. In the embodiment, the interrupting plan is divided into plural actions and the possibility of interrupt is determined based on the reference to the execution effect and the pre-execution condition of each action. However, the determination may be made with reference to the execution effect and the pre-execution condition of the interrupting plan itself.

Even when the processing state, which is represented as the belief information, of the mobile robot changes during the execution of the interrupting plan, the action can be executed without inconvenience as far as the pre-execution condition of the recovered action is satisfied at the timing of recovery.

A fourth modification is described. In the embodiment, the plan formulating unit 150 formulates plural interrupting plans for the interrupting goal, and the action executing unit 170 executes an action which does not affect the plan in execution. Alternatively, the plan formulating unit 150 may utilize the belief information stored in the belief DB 130 and the plan formulation knowledge stored in the plan formulation knowledge DB 140 to formulate only an action which does not affect the plan in execution. Then, in the formulation process, a plan that satisfies the condition in the influencing plan selection process described with reference to FIGS. 8 to 10 is formulated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A plan executing apparatus, comprising:
   an executing unit that executes a first plan including a plurality of actions to be executed in a predetermined order, action by action;
   an execution information storing unit configured to store therein the first plan, a pre-execution condition, and an execution effect while associating the pre-execution condition and execution effect with the first plan, the pre-execution condition indicating an initial state of a target object to be processed, which is changeable in response to the execution of the first plan and must be satisfied immediately before the execution of the first plan, and the execution effect indicating a resulting state of the target object to be processed, which holds immediately after the execution of the first plan;
   a state storing unit configured to store therein a current state of the target object to be processed;
   an interrupt instruction accepting unit that accepts an interrupt instruction of an interrupting plan during the execution of the first plan, the interrupting plan being stored in the execution information storing unit and being a different plan from the first plan executing;
   an interrupt information identifying unit that identifies the current state of the target object to be processed stored in the state storing unit, a pre-execution condition of the interrupting plan, and an execution effect of the interrupting plan, on accepting the interrupt instruction for the interrupting plan; and
   an interrupt possibility determining unit that determines whether the interrupting plan is to be executed based on whether the current state of the target object to be processed, the pre-execution condition of the interrupting plan, and the execution effect of the interrupting plan are equivalent to one another.

2. The plan executing apparatus according to claim 1, wherein
   the first plan includes the actions, each of which is a minimum unit of execution by the executing unit, the execution information storing unit stores therein the actions, the pre-execution condition, and the execution effect while associating the pre-execution condition and execution effect with each action, the pre-execution condition indicating the initial state of the target object to be processed, which must satisfy immediately before the execution of each action, and the execution effect indicating the resulting state of the target object to be processed, which holds immediately after the execution of each action, the interrupt information identifying unit further identifies an execution effect of a currently executed action executed by the executing unit, and a pre-execution condition of an action to be executed subsequent to the currently executed action, and the interrupt possibility determining unit determines whether the interrupting plan is to be executed or not based on whether the execution effect of the currently executed action and the pre-execution condition of the interrupting plan are equivalent to each other, as well as whether the execution effect of the interrupting plan and the pre-execution condition of the action to be executed subsequent to the currently executed action are equivalent to each other.

3. The plan executing apparatus according to claim 1, wherein the interrupt possibility determining unit determines that the interrupting plan is to be executed when the current state of the target object to be processed, the pre-execution condition of the interrupting plan, and the execution effect of the interrupting plan are equivalent to one another.

4. The plan executing apparatus according to claim 2, wherein the interrupt information identifying unit further identifies pre-execution conditions and execution effects of a plurality of actions to be executed after the currently executed action, and the interrupt possibility determining unit determines whether the interrupting plan is to be executed subsequent to a predetermined action to be executed after the currently executed action or not further based on whether the execution effect of the predetermined action of the actions executed after the currently executed action and the pre-execution condition of the interrupting plan are equivalent to each other, as well as whether the execution effect of the interrupting plan and the pre-execution condition of the action to be executed subsequent to the predetermined action are equivalent to each other.

5. The plan executing apparatus according to claim 1, wherein the interrupt possibility determining unit prohibits interrupt of the interrupting plan on determining that the pre-execution condition and the execution effect of the interrupting plan are not equivalent to each other.

6. A plan executing apparatus, comprising:

an executing unit that executes plans, each including a plurality of actions to be executed in a predetermined order, action by action;

an execution information storing unit configured to store therein the plans, and for each plan, a corresponding pre-execution condition, and a corresponding execution effect each pre-execution condition indicating a corresponding initial state of a target object to be processed, which is changeable in response to the execution of the corresponding plan and must be satisfied immediately before the execution of the corresponding plan, and each execution effect indicating a corresponding resulting state of the target object to be processed, which holds immediately after the execution of the corresponding plan;

a state storing unit configured to store therein a current state of the target object to be processed;

an interrupt instruction accepting unit that accepts an interrupt instruction during execution of a first plan;

an interrupting plan formulating unit that generates, as an interrupting plan among the plans stored in the execution information storing unit, a plan of which the corresponding pre-execution condition and the corresponding execution effect are equivalent to the current state of the target object to be processed stored in the state storing unit on accepting the interrupt instruction: and an interrupt controlling unit that interrupts the execution of the first plan with the interrupting plan.

7. The plan executing apparatus according to claim 6, wherein the interrupting plan formulating unit generates the interrupting plan that does not change the processing state of the target object to be processed.

8. The plan executing apparatus according to claim 6, wherein each of the plans includes the actions, each of which is a minimum unit of execution by the executing unit, the execution information storing unit stores therein the actions, and for each action, the corresponding pre-execution condition, and the corresponding execution effect each pre-execution condition indicating the corresponding initial state of the target object to be processed, which must be satisfied immediately before the execution of the corresponding action, and each execution effect indicating the corresponding resulting state of the target object to be processed, which holds immediately after the execution of the corresponding action, and the interrupting plan formulating unit generates, as the interrupting plan among the plans, a plan of which the corresponding pre-execution condition is equivalent to the execution effect of a currently executed action executed by the executing unit, as well as of which the corresponding execution effect is equivalent to the pre-execution condition of an action to be executed subsequent to the currently executed action.

9. A method executed by an apparatus for executing a first plan, the apparatus including:

an execution information storing unit configured to store therein the first plan, a pre-execution condition, and an execution effect while associating the pre-execution condition and execution effect with the first plan, the pre-execution condition indicating an initial state of a target object to be processed, which is changeable in response to execution of the first plan and must be satisfied immediately before the execution of the first plan, and the execution effect indicating a resulting state of the target object to be processed, which holds immediately after the execution of the first plan; and a state storing unit configured to store therein a current state of the target object to be processed, the method comprising:

executing, by the apparatus, the first plan including a plurality of actions to be executed in a predetermined order, action by action;

accepting, by the apparatus, an interrupt instruction of an interrupting plan during the execution of the first plan, the interrupting plan being stored in the execution information storing unit and being a different plan from the first plan executing;

identifying, by the apparatus, the current state of the target object to be processed stored in the state storing unit, a pre-execution condition of the interrupting plan, and an execution effect of the interrupting plan, on accepting the interrupt instruction of the interrupting plan;

determining, by the apparatus, whether the interrupting plan is to be executed or not based on whether the current state of the target object to be processed, the pre-execution condition of the interrupting plan, and the execution effect of the interrupting plan are equivalent to one another.

10. A method executed by an apparatus for executing plans, the apparatus including an execution information storing unit configured to store therein the plans, and for each plan, a corresponding pre-execution condition, and a corresponding execution effect each pre-execution condition indicating a corresponding initial state of a target object to be processed, which is changeable in response to the execution of the corresponding plan and must be satisfied immediately before the execution of the corresponding plan, and each execution effect indicating a corresponding resulting state of the target object to be processed, which holds immediately after the execution of the corresponding plan; and a state storing unit configured to store therein a current state of the target object to be processed, the method comprising:

executing, by the apparatus, a first plan including a plurality of actions to be executed in a predetermined order, action by action;

accepting, by the apparatus, an interrupt instruction during execution of the first plan;

generating, by the apparatus, as an interrupting plan among the plans stored in the execution information storing unit, a plan of which the corresponding pre-execution condition and the corresponding execution effect are equivalent to the current state of the target object to be processed stored in the state storing unit on accepting the interrupt instruction; and interrupting, by the apparatus, the execution of the first plan with the interrupting plan.

11. A computer readable medium storing programmed instructions for execution on a computer, the computer including an execution information storing unit configured to store therein a first plan, a pre-execution condition, and an execution effect while associating the pre-execution condition and execution effect with the first plan, the pre-execution condition indicating an initial state of a target object to be processed, which is changeable in response to execution of the first plan and must be satisfied immediately before the execution of the first plan, and the execution effect indicating a resulting state of the target object to be processed, which holds immediately after the execution of the plan; and a state storing unit configured to store therein a current state of the target object to be processed, wherein the instructions, when executed by the computer, cause the computer to perform the steps of:

executing the first plan including a plurality of actions to be executed in a predetermined order, action by action;

accepting an interrupt instruction of an interrupting plan during the execution of the first plan, the interrupting plan being stored in the execution information storing unit and being a different plan from the first plan executing;

identifying the current state of the target object to be processed stored in the state storing unit, a pre-execution condition of the interrupting plan, and an execution effect of the interrupting plan, on accepting the interrupt instruction of the interrupting plan;

determining whether the interrupting plan is to be executed or not based on whether the current state of the target object to be processed, the pre-execution condition of the interrupting plan, and the execution effect of the interrupting plan are equivalent to one another.

12. A computer readable medium storing programmed instructions for execution on a computer, the computer including an execution information storing unit configured to store therein plans, and for each plan, a corresponding pre-execution condition, and a corresponding execution effect each pre-execution condition indicating a corresponding initial state of a target object to be processed, which is changeable in response to the execution of the corresponding plan and must be satisfied immediately before the execution of the corresponding plan, and each execution effect indicating a corresponding resulting state of the target object to be processed, which holds immediately after the execution of the corresponding plan; and a state storing unit configured to store therein a current state of the target object to be processed, wherein the instructions, when executed by the computer, cause the computer to perform the steps of:

executing a first plan including a plurality of actions to be executed in a predetermined order, action by action;

accepting an interrupt instruction during execution of the first plan;

generating, as an interrupting plan among the plans stored in the execution information storing unit, a plan of which the corresponding pre-execution condition and the corresponding execution effect are equivalent to the current state of the target object to be processed stored in the state storing unit on accepting the interrupt instruction; and interrupting the execution of the first plan with the interrupting plan.

* * * * *